(12) United States Patent
Li et al.

(10) Patent No.: US 10,235,048 B2
(45) Date of Patent: Mar. 19, 2019

(54) DATA PROCESSING METHOD AND SMART DEVICE

(71) Applicant: Huawei Technologies Co., Ltd., Shenzhen (CN)

(72) Inventors: Zhigang Li, Shenzhen (CN); Guojun Shi, Beijing (CN); Yingchun Zhao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 149 days.

(21) Appl. No.: 15/322,298

(22) PCT Filed: Jun. 30, 2014

(86) PCT No.: PCT/CN2014/081253
§ 371 (c)(1),
(2) Date: Dec. 27, 2016

(87) PCT Pub. No.: WO2016/000166
PCT Pub. Date: Jan. 7, 2016

(65) Prior Publication Data
US 2017/0185311 A1    Jun. 29, 2017

(51) Int. Cl.
*G06F 3/06* (2006.01)
*G06F 21/62* (2013.01)
(Continued)

(52) U.S. Cl.
CPC ............ *G06F 3/0607* (2013.01); *G06F 3/068* (2013.01); *G06F 3/0644* (2013.01);
(Continued)

(58) Field of Classification Search
None
See application file for complete search history.

(56) References Cited

U.S. PATENT DOCUMENTS

2003/0182500 A1  9/2003  Raves et al.
2004/0103106 A1  5/2004  Takaki et al.
(Continued)

FOREIGN PATENT DOCUMENTS

CN       1501289 A    6/2004
CN     101178651 A    5/2008
(Continued)

OTHER PUBLICATIONS

Machine Translation and Abstract of Chinese Publication No. CN101178651, May 14, 2008, 35 pages.
(Continued)

*Primary Examiner* — Tracy C. Chan
(74) *Attorney, Agent, or Firm* — Fish & Richardson P.C.

(57) ABSTRACT

Embodiments of the present disclosure relate to the field of computer data processing, and provide a data processing method and a smart device, which can effectively resolve a problem of abnormal rewriting of data in a read-only partition of an embedded multimedia card (eMMC) while ensuring that normal upgrading is not affected. The method includes receiving a write protection cancellation command sent by a central processing unit, executing the write protection cancellation command on a specified partition that is in the read-only partition and that is used to store an upgrade file, receiving the upgrade file sent by the central processing unit, writing the upgrade file to the specified partition, after completing writing the upgrade file, sending a write completion message to the central processing unit, receiving a write protection command sent by the central processing unit, and executing the write protection command on the specified partition.

14 Claims, 12 Drawing Sheets

(51) Int. Cl.
*G06F 12/02* (2006.01)
*G06F 12/14* (2006.01)
*G06F 21/79* (2013.01)

(52) U.S. Cl.
CPC ........ *G06F 3/0659* (2013.01); *G06F 12/0246* (2013.01); *G06F 12/1441* (2013.01); *G06F 21/62* (2013.01); *G06F 21/79* (2013.01); *G06F 2212/1052* (2013.01)

(56) References Cited

U.S. PATENT DOCUMENTS

| | | | | |
|---|---|---|---|---|
| 2006/0112246 | A1* | 5/2006 | Boning | G06F 12/1483 711/163 |
| 2007/0169080 | A1* | 7/2007 | Friedman | G06F 8/65 717/168 |
| 2008/0082773 | A1 | 4/2008 | Tomlin et al. | |
| 2009/0228887 | A1 | 9/2009 | Taniguchi | |
| 2009/0259796 | A1* | 10/2009 | Awyong | G06F 12/0246 711/102 |
| 2010/0205149 | A1 | 8/2010 | Sekiya | |
| 2011/0179496 | A1 | 7/2011 | Oono | |
| 2015/0278118 | A1* | 10/2015 | Lee | G06F 12/145 711/102 |
| 2016/0070656 | A1* | 3/2016 | Babu | G06F 8/654 711/163 |
| 2017/0230239 | A1* | 8/2017 | Zhang | H04L 41/082 |

FOREIGN PATENT DOCUMENTS

| | | | | |
|---|---|---|---|---|
| CN | 101178661 | * | 5/2008 | ............ G06F 9/445 |
| CN | 101178661 | A | 5/2008 | |
| CN | 103366814 | A | 10/2013 | |
| CN | 103678144 | A | 3/2014 | |
| JP | 2009217433 | A | 9/2009 | |

OTHER PUBLICATIONS

Foreign Communication From a Counterpart Application, Chinese Application No. 201480036342.7, Chinese Office Action dated Apr. 4, 2018, 13 pages.
Machine Translation and Abstract of Chinese Publication No. CN101178661, May 14, 2008, 7 pages.
Machine Translation and Abstract of Chinese Publication No. CN103366814, Oct. 23, 2013, 7 pages.
Zhang, B., et al., "Smart TV Development on ARM Architecture and Android System," Dalian University of Technology, Mar. 30, 2012, 62 pages.
Partial English Translation of Zhang, B., et al., "Smart TV Development on ARM Architecture and Android System," Dalian University of Technology, Mar. 30, 2012, 4 pages.
Foreign Communication From a Counterpart Application, PCT Application No. PCT/CN2014/081253, English Translation of International Search Report dated Mar. 27, 2015, 2 pages.
Foreign Communication From a Counterpart Application, PCT Application No. PCT/CN2014/081253, English Translation of Written Opinion dated Mar. 27, 2015, 9 pages.

* cited by examiner

DATA PROCESSING METHOD AND SMART DEVICE

CROSS REFERENCE TO RELATED APPLICATIONS

This application is a national stage of International Application No. PCT/CN2014/081253, filed on Jun. 30, 2014, which is hereby incorporated by reference in its entirety.

TECHNICAL FIELD

The present disclosure relates to the field of computer data processing, and in particular, to a data processing method and a smart device.

BACKGROUND

An Embedded Multi Media Card (eMMC) is a type of multimedia card (MMC) interface, a flash memory, and a primary controller, and is mainly applied to consumer electronics products having a relatively high storage capacity, for example, smart devices such as mobile phones and tablet computers.

In the prior art, data in the eMMC may be protected using a Data Rights Management or digital rights management (DRM) function. For example, WIDEVINE software is installed on an ANDROID system smart device, and the data in the eMMC is encrypted using the WIDEVINE software, to prevent abnormal rewriting of the data in the eMMC.

However, WIDEVINE in nature is a pure software encryption technology, and merely increases the difficulty in altering the data in the eMMC. Currently, there are already hackers or enthusiasts who can crack a WIDEVINE password for rewriting the data or modify a preinstalled application of the smart device. Therefore, abnormal rewriting of the data in the eMMC after the mobile terminal is illegally rooted causes problems such as system instability of the smart device.

SUMMARY

Embodiments of the present disclosure provide a data processing method and a smart device, which can effectively resolve a problem of abnormal rewriting of data in a read-only partition of an eMMC while ensuring that normal upgrading is not affected.

To achieve the foregoing objective, the following technical solutions are used in the embodiments of the present disclosure.

According to a first aspect, a data processing method is provided, applied to an eMMC, where the eMMC includes a read-only partition, and the method includes receiving a write protection cancellation command sent by a central processing unit, executing the write protection cancellation command on a specified partition that is in the read-only partition and that is used to store an upgrade file, receiving the upgrade file sent by the central processing unit, writing the upgrade file to the specified partition, after completing writing the upgrade file, sending a write completion message to the central processing unit, receiving a write protection command sent by the central processing unit, and executing the write protection command on the specified partition.

With reference to the first aspect, in a first implementable manner, before the receiving a write protection cancellation command sent by a central processing unit, the method further includes executing a write protection command sent by the central processing unit on the read-only partition that needs write protection.

With reference to the first aspect or the first implementable manner, in a second implementable manner, the write protection cancellation command includes a physical address and a length used for executing the write protection cancellation command on the specified partition, the write protection command includes the physical address and a length used for executing the write protection command on the specified partition, and the physical address is a physical address to which the upgrade file needs to be written in the eMMC.

According to a second aspect, a data processing method is provided, applied to a central processing unit, where the method includes sending a write protection cancellation command to an eMMC, where the eMMC includes a read-only partition in a write protection state, sending an upgrade file to the eMMC, receiving a write completion message sent by the eMMC, where the write completion message includes a logical address of the upgrade file, and the write completion message is a message indicating that the eMMC successfully writes the upgrade file to a specified partition of the upgrade file, and sending a write protection command to the eMMC.

With reference to the second aspect, in a first implementable manner, before the sending a write protection cancellation command to an eMMC, the method further includes acquiring the logical address of the upgrade file in an upgrade data package, where the upgrade data package includes at least one upgrade file and a logical address of each upgrade file, querying a correspondence between preset logical addresses and read-only partitions according to the logical address of the upgrade file, acquiring the specified partition of the upgrade file, determining whether the specified partition of the upgrade file is a write-protected partition, and if the specified partition of the upgrade file is a write-protected partition, querying, according to the logical address of the upgrade file, for a physical address corresponding to the logical address of the upgrade file, where the physical address is a physical address to which the upgrade file needs to be written in the eMMC.

With reference to the first implementable manner, in a second implementable manner, after the receiving a write completion message sent by the eMMC, the method further includes querying the correspondence between preset logical addresses and read-only partitions according to the logical address of the upgrade file, acquiring the specified partition of the upgrade file, determining whether the specified partition of the upgrade file is a partition under write protection, and if the specified partition of the upgrade file is a partition under write protection, querying, according to the logical address of the upgrade file, for the physical address corresponding to the logical address of the upgrade file.

With reference to the second aspect or either of the first implementable manner and the second implementable manner, in a third implementable manner, the write protection cancellation command includes the physical address and a length used for executing the write protection cancellation command on the specified partition, and the write protection command includes the physical address and a length used for executing the write protection command on the specified partition.

With reference to the third implementable manner, in a fourth implementable manner, before the acquiring the logical address of the upgrade file in an upgrade data package, the method further includes checking whether a power failure protection identifier is an abnormal power failure identifier, if the power failure protection identifier is an abnormal power failure identifier, acquiring a physical address corresponding to a logical address of the read-only partition that needs write protection in the eMMC, and sending a write protection command to the eMMC, where the write protection command includes the physical address and a length used for executing the write protection command on the read-only partition.

With reference to the second aspect or any one of the first implementable manner to the fourth implementable manner, in a fifth implementable manner, after the sending a write protection command to the eMMC, the method further includes reading read-only state attribute control information of each partition of the eMMC, where the read-only state attribute control information includes a partition number, a write protection attribute of the partition, a next startup write protection state of the partition, and a current write protection state of the partition, determining, according to the partition number, whether the partition corresponding to the partition number is a partition under write protection, and if the partition corresponding to the partition number is a partition under write protection, reading the next startup write protection state of the partition corresponding to the partition number from the read-only state attribute control information.

With reference to the fifth implementable manner, in a sixth implementable manner, after the reading the next startup write protection state of the partition corresponding to the partition number from the read-only state attribute control information, the method further includes determining whether the next startup write protection state of the partition corresponding to the partition number is the write protection state, if the next startup write protection state of the partition corresponding to the partition number is the write protection state, determining whether the partition corresponding to the partition number is a write-protected partition, if the partition corresponding to the partition number is not a write-protected partition, setting the partition to a write-protected partition, and updating the current write protection state of the partition to the write protection state, and if the partition corresponding to the partition number is a write-protected partition, updating the current write protection state of the partition.

With reference to the sixth implementable manner, in a seventh implementable manner, after the reading the next startup write protection state of the partition corresponding to the partition number from the read-only state attribute control information, the method further includes determining whether the next startup write protection state of the partition corresponding to the partition number is the write protection state, if the next startup write protection state of the partition corresponding to the partition number is not the write protection state, determining whether the partition corresponding to the partition number is a write-protected partition, if the partition corresponding to the partition number is a write-protected partition, canceling write protection of the partition, and updating the current write protection state of the partition, and if the partition corresponding to the partition number is not a write-protected partition, updating the current write protection state of the partition.

According to a third aspect, an eMMC is provided, where the eMMC includes a read-only partition, and the eMMC includes a first receiving unit, configured to receive a write protection cancellation command sent by a central processing unit, a first execution unit, configured to execute the write protection cancellation command on a specified partition that is in the read-only partition and that is used to store an upgrade file, a second receiving unit, configured to receive the upgrade file sent by the central processing unit, a writing unit, configured to write the upgrade file to the specified partition, a sending unit, configured to, after the writing of the upgrade file is completed, send a write completion message to the central processing unit, a third receiving unit, configured to receive a write protection command sent by the central processing unit, and a second execution unit, configured to execute the write protection command on the specified partition.

With reference to the third aspect, in a first possible implementable manner, the eMMC further includes a third execution unit, configured to execute a write protection command sent by the central processing unit on the read-only partition that needs write protection.

With reference to the first aspect or the first implementable manner, in a second implementable manner, the write protection cancellation command includes a physical address and a length used for executing the write protection cancellation command on the specified partition, the write protection command includes the physical address and a length used for executing the write protection command on the specified partition, and the physical address is a physical address to which the upgrade file needs to be written in the eMMC.

According to a fourth aspect, a central processing unit is provided, including a first sending unit, configured to send a write protection cancellation command to an eMMC, where the eMMC includes a read-only partition in a write protection state, a second sending unit, configured to send an upgrade file to the eMMC, a receiving unit, configured to receive a write completion message sent by the eMMC, where the write completion message includes a logical address of the upgrade file, and the write completion message is a message indicating that the eMMC successfully writes the upgrade file to a specified partition of the upgrade file, and a third sending unit, configured to send a write protection command to the eMMC.

With reference to the fourth aspect, in a first implementable manner, the central processing unit further includes a first acquiring unit, configured to acquire the logical address of the upgrade file in an upgrade data package, where the upgrade data package includes at least one upgrade file and a logical address of each upgrade file, a first query unit, configured to query a correspondence between preset logical addresses and read-only partitions according to the logical address of the upgrade file, a second acquiring unit, configured to acquire the specified partition of the upgrade file, a first determining unit, configured to determine whether the specified partition of the upgrade file is a write-protected partition, and a second query unit, configured to if the specified partition of the upgrade file is a write-protected partition, query, according to the logical address of the upgrade file, for a physical address corresponding to the logical address of the upgrade file, where the physical address is a physical address to which the upgrade file needs to be written in the eMMC.

With reference to the first implementable manner, in a second implementable manner, the central processing unit further includes a third query unit, configured to query the correspondence between preset logical addresses and read-only partitions according to the logical address of the upgrade file, a third acquiring unit, configured to acquire the specified partition of the upgrade file a second determining unit, configured to determine whether the specified partition of the upgrade file is a partition under write protection, and a fourth query unit, configured to, if the specified partition of the upgrade file is a partition under write protection, query, according to the logical address of the upgrade file, for the physical address corresponding to the logical address of the upgrade file.

With reference to the fourth aspect or either of the first implementable manner and the second implementable manner, in a third implementable manner, the write protection cancellation command includes the physical address and a length used for executing the write protection cancellation command on the specified partition, and the write protection command includes the physical address and a length used for executing the write protection command on the specified partition.

With reference to the third implementable manner, in a fourth implementable manner, the central processing unit further includes a checking unit, configured to check whether a power failure protection identifier is an abnormal power failure identifier, a fourth acquiring unit, configured to, if the power failure protection identifier is an abnormal power failure identifier, acquire a physical address corresponding to a logical address of the read-only partition that needs write protection in the eMMC, and a fourth sending unit, configured to send a write protection command to the eMMC, where the write protection command includes the physical address and a length used for executing the write protection command on the read-only partition.

With reference to the fourth aspect or any one of the first implementable manner to the fourth implementable manner, in a fifth implementable manner, the central processing unit further includes a first reading unit, configured to read read-only state attribute control information of each partition of the eMMC, where the read-only state attribute control information includes a partition number, a write protection attribute of the partition, a next startup write protection state of the partition, and a current write protection state of the partition, a third determining unit, configured to determine, according to the partition number, whether the partition corresponding to the partition number is a partition under write protection, and a second reading unit, configured to, if the partition corresponding to the partition number is a partition under write protection, read the next startup write protection state of the partition corresponding to the partition number from the read-only state attribute control information.

With reference to the fifth implementable manner, in a sixth implementable manner, the central processing unit further includes a fourth determining unit, configured to determine whether the next startup write protection state of the partition corresponding to the partition number is the write protection state, where the fourth determining unit is further configured to, if the next startup write protection state of the partition corresponding to the partition number is the write protection state, determine whether the partition corresponding to the partition number is a write-protected partition, a setting unit, configured to, if the partition corresponding to the partition number is not a write-protected partition, set the partition to a write-protected partition, and a first updating unit, configured to update the current write protection state of the partition to the write protection state, where the first updating unit is further configured to, if the partition corresponding to the partition number is a write-protected partition, update the current write protection state of the partition.

With reference to the sixth implementable manner, in a seventh implementable manner, the fourth determining unit is further configured to determine whether the next startup write protection state of the partition corresponding to the partition number is the write protection state, the fourth determining unit is further configured to, if the next startup write protection state of the partition corresponding to the partition number is not the write protection state, determine whether the partition corresponding to the partition number is a write-protected partition, and the central processing unit further includes a cancellation unit, configured to, if the partition corresponding to the partition number is a write-protected partition, cancel write protection of the partition, and a second updating unit, configured to update the current write protection state of the partition, where the second updating unit is further configured to, if the partition corresponding to the partition number is not a write-protected partition, update the current write protection state of the partition.

According to a fifth aspect, a smart device is provided, including any eMMC described in the foregoing and any central processing unit described in the foregoing.

According to a sixth aspect, an eMMC is provided, where the eMMC includes a read-only partition, and the eMMC includes a receiver, configured to receive a write protection cancellation command sent by a central processing unit, a memory, used to store program code, a processor, configured to invoke the program code stored in the memory, to execute the following method: executing the write protection cancellation command on a specified partition that is in the read-only partition and that is used to store an upgrade file, where the receiver is further configured to receive the upgrade file sent by the central processing unit, and the processor is further configured to write the upgrade file to the specified partition, and a transmitter, configured to, after the writing of the upgrade file is completed, send a write completion message to the central processing unit, where the receiver is further configured to receive a write protection command sent by the central processing unit, and the processor is further configured to execute the write protection command on the specified partition.

With reference to the sixth aspect, in a first implementable manner, the processor is further configured to execute a write protection command sent by the central processing unit on the read-only partition that needs write protection.

With reference to the sixth aspect or the first implementable manner, in a second implementable manner, the write protection cancellation command includes a physical address and a length used for executing the write protection cancellation command on the specified partition, the write protection command includes the physical address and a length used for executing the write protection command on the specified partition, and the physical address is a physical address to which the upgrade file needs to be written in the eMMC.

According to a seventh aspect, a central processing unit is provided, including a transmitter, configured to send a write protection cancellation command to an eMMC, where the eMMC includes a read-only partition in a write protection state, where the transmitter is further configured to send an upgrade file to the eMMC, and a receiver, configured to receive a write completion message sent by the eMMC, where the write completion message includes a logical address of the upgrade file, and the write completion message is a message indicating that the eMMC successfully writes the upgrade file to a specified partition of the upgrade file, where the transmitter is further configured to send a write protection command to the eMMC.

With reference to the seventh aspect, in a first implementable manner, the central processing unit further includes a memory, used to store program code, and a processor, configured to invoke the program code stored in the memory, to execute the following method: acquiring the logical address of the upgrade file in an upgrade data package, where the upgrade data package includes at least one upgrade file and a logical address of each upgrade file, querying a correspondence between preset logical addresses and read-only partitions according to the logical address of the upgrade file, acquiring the specified partition of the upgrade file, determining whether the specified partition of the upgrade file is a write-protected partition, and if the specified partition of the upgrade file is a write-protected partition, querying, according to the logical address of the upgrade file, for a physical address corresponding to the logical address of the upgrade file, where the physical address is a physical address to which the upgrade file needs to be written in the eMMC.

With reference to the first implementable manner, in a second implementable manner, the processor is further configured to query the correspondence between preset logical addresses and read-only partitions according to the logical address of the upgrade file, acquire the specified partition of the upgrade file, determine whether the specified partition of the upgrade file is a partition under write protection, and if the specified partition of the upgrade file is a partition under write protection, query, according to the logical address of the upgrade file, for the physical address corresponding to the logical address of the upgrade file.

With reference to the seventh aspect or either of the first implementable manner and the second implementable manner, in a third implementable manner, the write protection cancellation command includes the physical address and a length used for executing the write protection cancellation command on the specified partition, and the write protection command includes the physical address and a length used for executing the write protection command on the specified partition.

With reference to the third implementable manner, in a fourth implementable manner, the processor is further configured to check whether a power failure protection identifier is an abnormal power failure identifier, and if the power failure protection identifier is an abnormal power failure identifier, acquire a physical address corresponding to a logical address of the read-only partition that needs write protection in the eMMC, where the transmitter is further configured to send a write protection command to the eMMC, where the write protection command includes the physical address and a length used for executing the write protection command on the read-only partition.

With reference to the seventh aspect or any one of the first implementable manner to the fourth implementable manner, in a fifth implementable manner, the processor is further configured to read read-only state attribute control information of each partition of the eMMC, where the read-only state attribute control information includes a partition number, a write protection attribute of the partition, a next startup write protection state of the partition, and a current write protection state of the partition, determine, according to the partition number, whether the partition corresponding to the partition number is a partition under write protection, and if the partition corresponding to the partition number is a partition under write protection, read the next startup write protection state of the partition corresponding to the partition number from the read-only state attribute control information.

With reference to the fifth implementable manner, in a sixth implementable manner, the processor is further configured to determine whether the next startup write protection state of the partition corresponding to the partition number is the write protection state, if the next startup write protection state of the partition corresponding to the partition number is the write protection state, determine whether the partition corresponding to the partition number is a write-protected partition, if the partition corresponding to the partition number is not a write-protected partition, set the partition to a write-protected partition, and update the current write protection state of the partition to the write protection state, and if the partition corresponding to the partition number is a write-protected partition, update the current write protection state of the partition.

With reference to the sixth implementable manner, in a seventh implementable manner, the processor is further configured to determine whether the next startup write protection state of the partition corresponding to the partition number is the write protection state, if the next startup write protection state of the partition corresponding to the partition number is not the write protection state, determine whether the partition corresponding to the partition number is a write-protected partition, if the partition corresponding to the partition number is a write-protected partition, cancel write protection of the partition, and update the current write protection state of the partition, and if the partition corresponding to the partition number is not a write-protected partition, update the current write protection state of the partition.

According to an eighth aspect, a smart device is provided, including any eMMC described in the foregoing and any central processing unit described in the foregoing.

The embodiments of the present disclosure provide a data processing method and a smart device. Before a smart device acquires an upgrade data package and rewrites data in a specified partition of an eMMC, the eMMC of the smart device executes a write protection cancellation command on the specified partition of an upgrade file, then the eMMC writes the upgrade file to the specified partition, and the eMMC executes a write protection command on the specified partition. Compared with the prior art, this embodiment can be effectively resolve a problem of abnormal rewriting of data in a specified partition of an eMMC while ensuring that normal upgrading is not affected.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
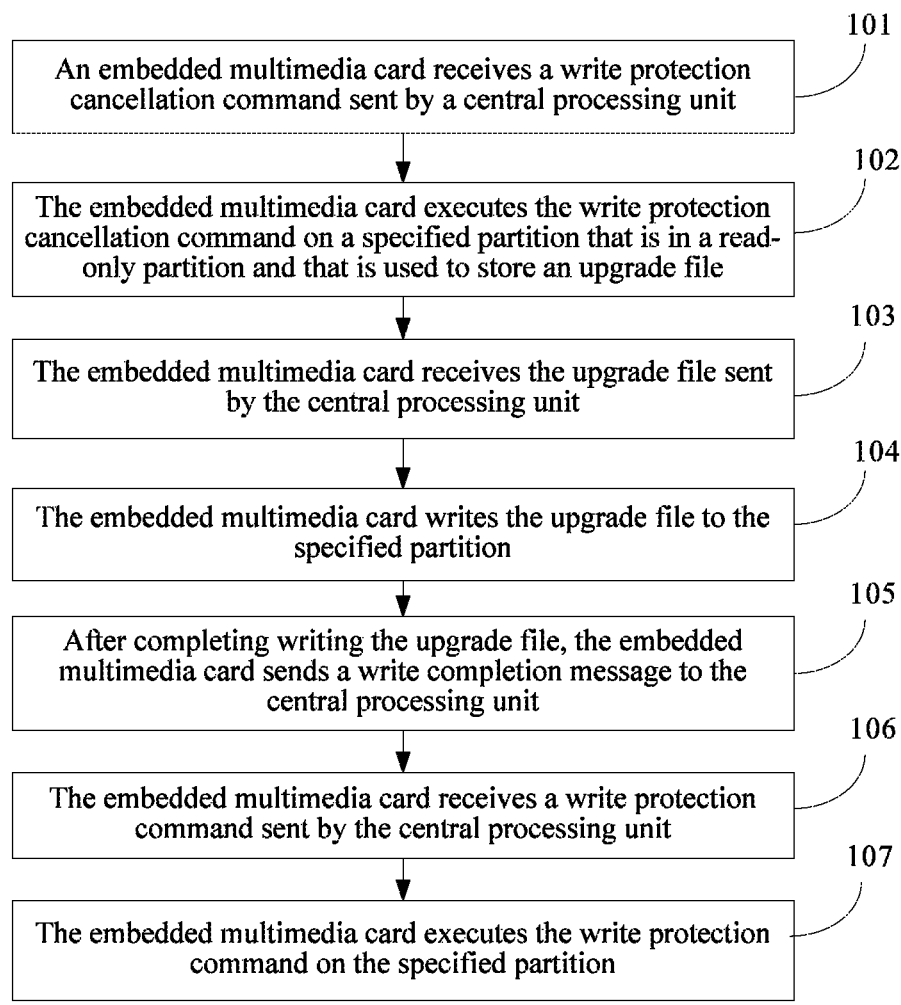
FIG. 1 is a flowchart of a data processing method according to an embodiment of the present disclosure.

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

The terms used in the embodiments of the present disclosure are merely for the purpose of illustrating specific embodiments, and are not intended to limit the present disclosure. The terms "a", "said" and "the" of singular forms used in the embodiments and the appended claims of the present disclosure are also intended to include plural forms, unless otherwise specified in the context clearly. It should also be understood that, the term "and/or" used herein indicates and includes any or all possible combinations of one or more associated listed items.

It should be understood that terms such as specified partition and mount partition may be used to describe a part of a read-only partition in the embodiments of the present disclosure, but the specified partition and the mount partition shall not be limited to these terms. These terms are merely used to distinguish different areas in the read-only partition. For example, the specified partition may represent a system partition or a superblock in an Android system.

Depending on a context, the word "if" used herein may be explained as "in this case" or "when" or "as a response when it is determined that" or "as a response when it is judged that" or "as a response when it is detected that". Similarly, depending on a context, the phrase "if it is determined that" or "if it is judged that" or "if it is detected that (a declarative condition or event)" may be explained as "when it is determined" "or "as a response when it is determined that" or "when it is detected that (a declarative condition or event)" or "when it is judged that (a declarative condition or event)" or "as a response when it is detected that (a declarative condition or event)".

In the prior art, an eMMC is set in a smart device. The eMMC has a write protection function. The eMMC has functions of permanent write protection, power-on write protection, and temporary write protection. The permanent write protection can be set only once, and cannot be canceled once successfully set. The power-on write protection needs to be set each time the smart device is powered on, and the write protection function becomes invalid when the smart device is powered off. The temporary write protection is set using a command, to enable the write protection function or cancel the write protection function, and is still valid after the smart device is powered off, and the write protection can be canceled only using a command. The eMMC protocol specifies control commands such as a control command for enabling the write protection function and a control command for canceling the write protection function.

Generally, the eMMC has different partitions. The partitions may be a read-only partition, a readable-writable partition, or the like. A partition table of the smart device records the partitions of the eMMC. The read-only partition may be a system BootLoader partition or a system partition. The read-only partition stores a system program or a preinstalled application. The readable-writable partition may be a user data partition or a Universal Serial Bus Hard Disk Drive (U-disk) partition.

In the case of smart device upgrading or legal superuser rights (root), data in the read-only partition of the smart device may be allowed to be rewritten, and rewriting in any other cases is considered as abnormal rewriting. Abnormal rewriting of the data in the read-only partition may cause abnormalities in some functions of the smart device, a boot failure of the smart device, data loss, or other cases.

In the present disclosure, the temporary write protection function of the eMMC is used, to perform write protection on the read-only partition of the eMMC.

Embodiment 1

This embodiment of the present disclosure provides a data processing method, applied to an eMMC, where the eMMC includes a read-only partition. As shown in FIG. 1, the method includes the following steps:

Step 101: The eMMC receives a write protection cancellation command sent by a central processing unit.

Step 102: The eMMC executes the write protection cancellation command on a specified partition that is in the read-only partition and that is used to store an upgrade file.

Step 103: The eMMC receives the upgrade file sent by the central processing unit.

Step 104: The eMMC writes the upgrade file to the specified partition.

Step 105: After completing writing the upgrade file, the eMMC sends a write completion message to the central processing unit.

Step 106: The eMMC receives a write protection command sent by the central processing unit.

Step 107: The eMMC executes the write protection command on the specified partition.

In this way, before rewriting data in a specified partition of an eMMC, the eMMC of a smart device executes a write protection cancellation command on the specified partition of an upgrade file, then the eMMC writes the upgrade file to the specified partition, and the eMMC executes a write protection command on the specified partition. Compared with the prior art, this embodiment can be effectively resolve a problem of abnormal rewriting of data in a specified partition of an eMMC while ensuring that normal upgrading is not affected.

It should be noted that the smart device includes the central processing unit and the eMMC, and the eMMC includes the read-only partition. Before the write protection cancellation command sent by the central processing unit is received, a write protection command sent by the central processing unit is executed on the read-only partition that needs write protection in the eMMC, to prevent abnormal rewriting of data in the read-only partition of the smart device. A range of the read-only partition is correspondingly equal to a range of the write-protected partition.

The write protection command may be SET_WRITE_PROT. A length used for executing the write protection command on the read-only partition may be SEND_WRITE_PROT. A type of the write protection command may be SEND_WRITE_PROT TYPE. The type of the write protection command in the present disclosure is temporary write protection. The write protection cancellation command may be CLR_WRITE_PROT. A length used for executing the write protection cancellation command on the read-only partition may be SEND_WRITE_PROT. A type of the write protection cancellation command may be SEND_WRITE_PROT TYPE. The type of the write protection cancellation command in the present disclosure is temporary cancellation of write protection.

In the present disclosure, a temporary write protection function of the eMMC is used, to perform write protection on the read-only partition of the eMMC.

Embodiment 2

Figure 2:
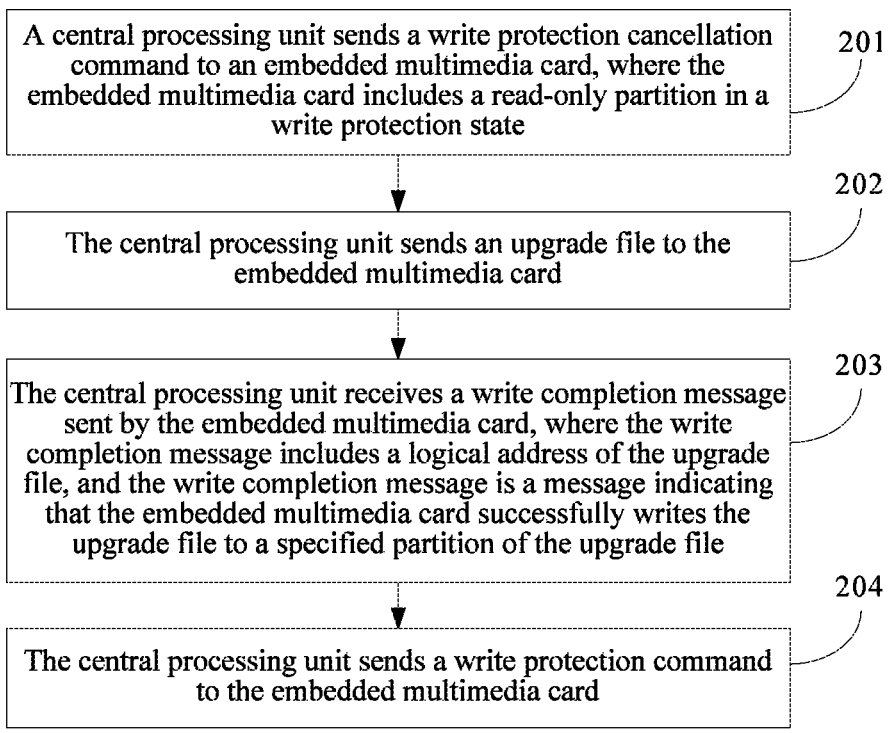
FIG. 2 is a flowchart of another data processing method according to an embodiment of the present disclosure.

This embodiment of the present disclosure provides a data processing method, applied to a central processing unit. As shown in FIG. 2, the method includes the following steps:

Step 201: The central processing unit sends a write protection cancellation command to an eMMC, where the eMMC includes a read-only partition in a write protection state.

Step 202: The central processing unit sends an upgrade file to the eMMC.

Step 203: The central processing unit receives a write completion message sent by the eMMC, where the write completion message includes a logical address of the upgrade file, and the write completion message is a message indicating that the eMMC successfully writes the upgrade file to a specified partition of the upgrade file.

Step 204: The central processing unit sends a write protection command to the eMMC.

In this way, before data in a specified partition of an eMMC is rewritten, a write protection cancellation command and an upgrade file are first sent to the eMMC, so that the eMMC of a smart device executes the write protection cancellation command on the specified partition of the upgrade file and writes the upgrade file to the specified partition, after a write completion message sent by the eMMC is received, a write protection command is sent to the eMMC, to perform write protection on the specified partition again. Compared with the prior art, this embodiment can be effectively resolve a problem of abnormal rewriting of data in a specified partition of an eMMC while ensuring that normal upgrading is not affected.

Embodiment 3

An objective of this embodiment of the present disclosure is to perform write protection control on a read-only partition that needs write protection in an eMMC during a system upgrade process of a smart device. Another objective of this embodiment of the present disclosure lies in that when an abnormal power failure occurs during the upgrade process of the smart device, after the smart device starts up again, the eMMC of the smart device upgrades the read-only partition that needs write protection in the eMMC again, but the read-only partition is not write-protected, and in this case, the smart device performs write protection on the read-only partition again, and then upgrades the read-only partition that needs write protection in the eMMC.

Figure 3:
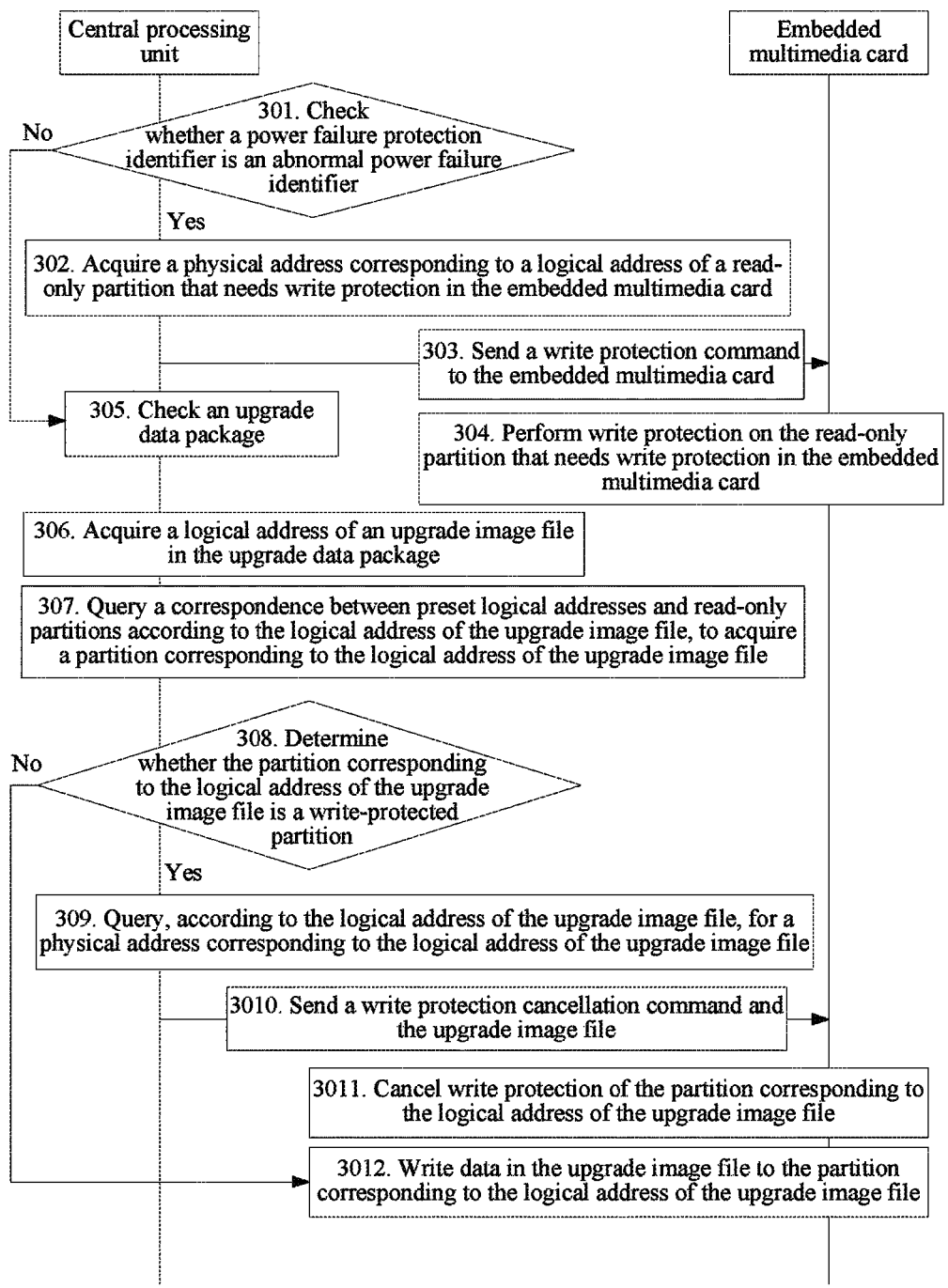
FIG. 3 is a flowchart of still another data processing method according to an embodiment of the present disclosure.

This embodiment of the present disclosure provides a data processing method, applied to a central processing unit and an eMMC. As shown in FIG. 3, the method includes the following steps:

Step 301: The central processing unit checks whether a power failure protection identifier is an abnormal power failure identifier.

If the power failure protection identifier is an abnormal power failure identifier, perform step 302.

If the power failure protection identifier is not an abnormal power failure identifier, perform step 305.

For example, when the power failure protection identifier is 0, it may indicate that the power failure protection identifier is not an abnormal power failure identifier, when the power failure protection identifier is 1, it may indicate that the power failure protection identifier is an abnormal power failure identifier.

A user may press a power button of a smart device for 1 second to 3 seconds, to start the smart device, and then the smart device detects an upgrade data package. In this case, the smart device checks whether a power failure protection identifier is an abnormal power failure identifier.

It should be noted that when the smart device determines that the power failure protection identifier is an abnormal power failure identifier, it may be because the smart device is running a program such as an upgrade data package when the smart device is on before the current startup, for example, a power failure suddenly occurs in the smart device when the smart device is upgrading a system version, in this case, the power failure protection identifier is updated to an abnormal power failure identifier.

Step 302: The central processing unit acquires a physical address corresponding to a logical address of a read-only partition that needs write protection in the eMMC.

A partition table of the eMMC is stored in the central processing unit, where the partition table records a correspondence between partitions of the eMMC and logical addresses of the partitions and a correspondence between the logical addresses and physical addresses of the eMMC that correspond to the logical addresses. For example, if a system program or a system boot loading program of the smart device is stored in a partition of the eMMC, the partition may be considered as a read-only partition, for example, the read-only partition may be a system partition or a system BootLoader partition, if user data of the smart device is stored in a partition of the eMMC, the partition may be considered as a readable-writable partition, for example, the readable-writable partition may be a user data partition or a U-disk partition.

The central processing unit may acquire the logical address of the read-only partition that needs write protection in the eMMC, and acquire, according to the logical address, the physical address corresponding to the logical address. The acquiring of the logical address by the central processing unit and the acquiring of the physical address according to the logical address belong to the prior art, which is not described in detail in the present disclosure.

Step 303: The central processing unit sends a write protection command to the eMMC.

The write protection command includes the physical address that is acquired by the central processing unit and that corresponds to the logical address of the read-only partition that needs write protection in the eMMC, a length used for executing the write protection command on the read-only partition, and a type of the write protection command.

The write protection command may be SET_WRITE_PROT. The length used for executing the write protection command on the read-only partition may be SEND_WRITE_PROT. The type of the write protection command may be SEND_WRITE_PROT TYPE. The type of the write protection command in the present disclosure is temporary write protection.

Step 304: The eMMC performs, according to the write protection command sent by the central processing unit, write protection on the read-only partition that needs write protection in the eMMC.

The eMMC includes a controller. The controller of the eMMC finds, according to the physical address, the read-only partition corresponding to the physical address, and the eMMC performs, according to the write protection command sent by the central processing unit, write protection on the read-only partition that needs write protection in the eMMC.

In this way, when the central processing unit of the smart device determines that the power failure protection identifier is an abnormal power failure identifier, the eMMC resets, according to the write protection command sent by the central processing unit, write protection of the read-only partition that needs write protection in the eMMC, so as to effectively prevent abnormal rewriting of data in the read-only partition when the read-only partition that needs write protection in the eMMC is not write-protected.

Step 305: The central processing unit checks an upgrade data package.

The central processing unit reads Cyclic Redundancy Check (CRC) data from the upgrade data package, checks the CRC data, reads Message Digest Algorithm 5 (MD5) data, checks the MD5 data, reads platform code, checks the platform code, reads version information of the upgrade data package, checks the version information of the upgrade data package, and so on. The checking of the CRC data, the MD5 data, the platform code, and the version information of the upgrade data package in the upgrade data package by the central processing unit belongs to the prior art, which is not described in detail in the present disclosure.

Step 306: The central processing unit acquires a logical address of an upgrade image file in the upgrade data package.

The central processing unit acquires the logical address of the upgrade image file in the upgrade data package from the upgrade data package.

It should be noted that the upgrade data package includes at least one upgrade image file, a logical address of each upgrade image file, a file name of each upgrade image file, a version number of each upgrade image file, and other information. The image file may be similar to a ZIP compressed package, that is, a series of particular files may be made into a single file according to a given format, to facilitate downloading and use by a user, for example, a beta version of an operating system or a game.

Step 307: The central processing unit queries a correspondence between preset logical addresses and read-only partitions according to the logical address of the upgrade image file, to acquire a partition corresponding to the logical address of the upgrade image file.

A correspondence between all preset logical addresses of the eMMC and read-only partitions is stored in the central processing unit. The central processing unit first compares the logical address of the upgrade image file with all the preset logical addresses of the eMMC that are stored in the central processing unit, to obtain a preset logical address that is equal to the logical address of the upgrade image file, and then obtains a partition of the eMMC according to the correspondence between preset logical addresses and read-only partitions, that is, the partition is a partition corresponding to the logical address of the upgrade image file.

Step 308: The central processing unit determines whether the partition corresponding to the logical address of the upgrade image file is a write-protected partition.

If the partition corresponding to the logical address of the upgrade image file is a write-protected partition, perform step 309.

If the partition corresponding to the logical address of the upgrade image file is not a write-protected partition, perform step 3012.

The central processing unit may determine, according to a partition number of the partition corresponding to the logical address of the upgrade image file, whether the partition is a partition that needs write protection, and if the central processing unit determines, according to the partition number of the partition corresponding to the logical address of the upgrade image file, that the partition is a partition that needs write protection, the central processing unit determines whether the partition corresponding to the logical address of the upgrade image file is already write-protected, that is, the central processing unit determines whether the partition corresponding to the logical address of the upgrade image file is a write-protected partition. The partition corresponding to the logical address of the upgrade image file may be the entire read-only partition of the eMMC.

Step 309: The central processing unit queries, according to the logical address of the upgrade image file, for a physical address corresponding to the logical address of the upgrade image file.

The physical address corresponding to the logical address of the upgrade image file is stored in the central processing unit. The central processing unit queries, according to the logical address of the upgrade image file, for the physical address corresponding to the logical address of the upgrade image file. The physical address is a physical address to which the upgrade file needs to be written in the eMMC. It should be noted that the querying for the physical address according to the logical address belongs to the prior art, which is not described in detail in the present disclosure.

Step 3010: The central processing unit sends a write protection cancellation command and the upgrade image file to the eMMC.

The write protection cancellation command includes the physical address to which the upgrade image file is written in the eMMC, a length used for executing the write protection cancellation command on the read-only partition, and a type of the write protection cancellation command.

The write protection cancellation command may be CLR_WRITE_PROT. The length used for executing the write protection cancellation command on the read-only partition may be SEND_WRITE_PROT. The type of the write protection cancellation command may be SEND_WRITE_PROT TYPE. The type of the write protection cancellation command in the present disclosure is temporary cancellation of write protection.

Step 3011: The eMMC cancels, according to the write protection cancellation command sent by the central processing unit, write protection of the partition corresponding to the logical address of the upgrade image file.

Step 3012: The eMMC writes data in the upgrade image file to the partition corresponding to the logical address of the upgrade image file.

Figure 4:
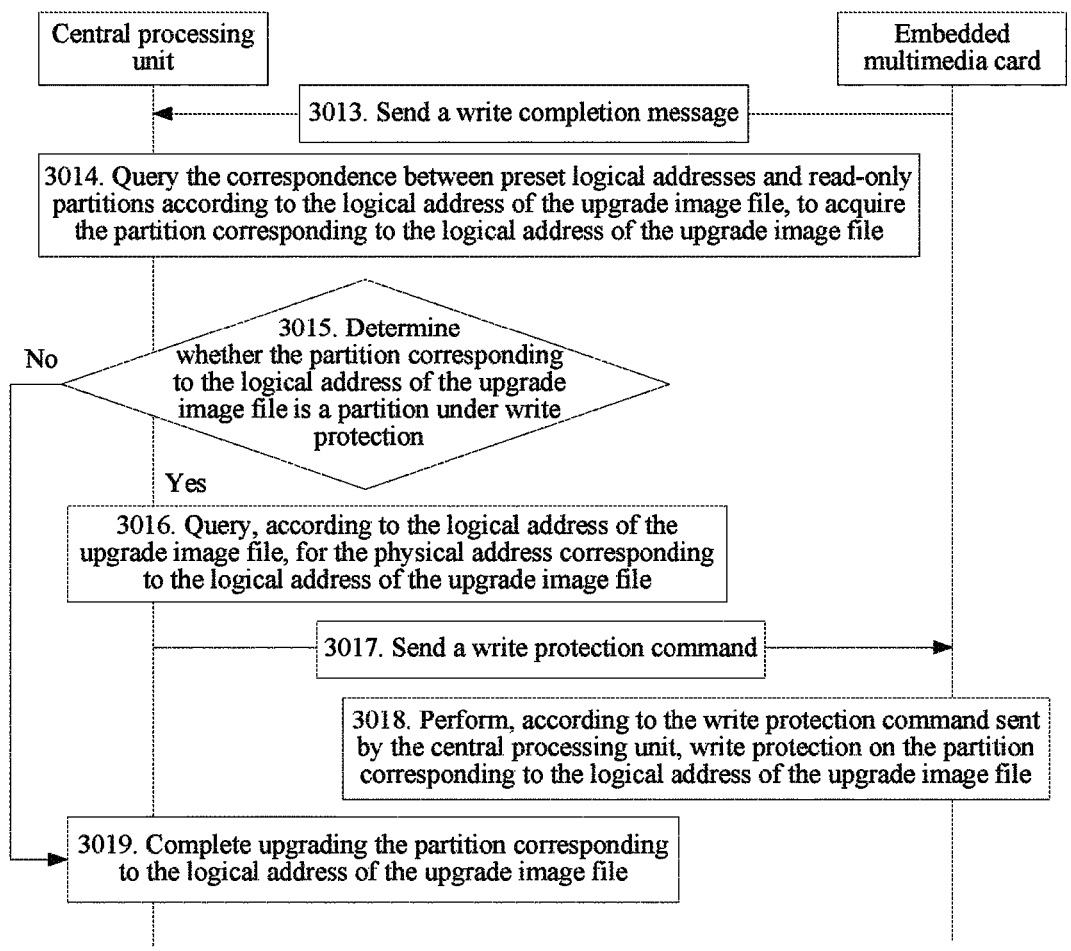
FIG. 4 is a flowchart of yet another data processing method according to an embodiment of the present disclosure.

Based on FIG. 3, as shown in FIG. 4, after step 3012, the method further includes the following steps:

Step 3013: The eMMC sends a write completion message to the central processing unit.

The write completion message includes the logical address of the upgrade image file. The write completion message is a message indicating that the eMMC successfully writes the data in the upgrade image file to the partition corresponding to the logical address of the upgrade image file.

Step 3014: The central processing unit queries the correspondence between preset logical addresses and read-only partitions according to the logical address of the upgrade image file, to acquire the partition corresponding to the logical address of the upgrade image file.

The correspondence between all preset logical addresses of the eMMC and read-only partitions is stored in the central processing unit. The central processing unit first compares the logical address of the upgrade image file with all the preset logical addresses of the eMMC that are stored in the central processing unit, to obtain a preset logical address that is equal to the logical address of the upgrade image file, and then obtains a partition of the eMMC according to the correspondence between preset logical addresses and read-only partitions, that is, the partition is a partition corresponding to the logical address of the upgrade image file.

Step 3015: The central processing unit determines whether the partition corresponding to the logical address of the upgrade image file is a partition under write protection.

If the partition corresponding to the logical address of the upgrade image file is a partition under write protection, perform step 3016.

If the partition corresponding to the logical address of the upgrade image file is not a partition under write protection, perform step 3019.

The central processing unit may determine, according to a partition number of the partition corresponding to the logical address of the upgrade image file, whether the partition is a partition that needs write protection, and if the central processing unit determines, according to the partition number of the partition corresponding to the logical address of the upgrade image file, that the partition is a partition that needs write protection, the central processing unit determines whether the partition corresponding to the logical address of the upgrade image file is already write-protected, that is, the central processing unit determines whether the partition corresponding to the logical address of the upgrade image file is a write-protected partition.

Step 3016: The central processing unit queries, according to the logical address of the upgrade image file, for the physical address corresponding to the logical address of the upgrade image file.

The physical address corresponding to the logical address of the upgrade image file is stored in the central processing unit. The central processing unit queries, according to the logical address of the upgrade image file, for the physical address corresponding to the logical address of the upgrade image file.

Step 3017: The central processing unit sends a write protection command to the eMMC.

The write protection command includes the physical address corresponding to the logical address of the upgrade image file, a length used for executing the write protection command on the read-only partition, and a type of the write protection command. The write protection command may be SET_WRITE_PROT. The length used for executing the write protection command on the read-only partition may be SEND_WRITE_PROT. The type of the write protection command may be SEND_WRITE_PROT TYPE. The type of the write protection command in the present disclosure is temporary write protection.

Step 3018: The eMMC performs, according to the write protection command sent by the central processing unit, write protection on the partition corresponding to the logical address of the upgrade image file.

Step 3019: The central processing unit completes upgrading the partition corresponding to the logical address of the upgrade image file.

In an embodiment, the smart device may simultaneously upgrade multiple specified partitions of the eMMC, or may separately upgrade each specified partition. Besides, the smart device may dynamically set a control range of write protection according to a location and a size of the specified partition of the eMMC.

According to the data processing method in this embodiment of the present disclosure, a central processing unit of a smart device sends a write protection command to an eMMC, the eMMC performs write protection on a read-only partition of the eMMC in advance, then, if the smart device needs to rewrite data in the read-only partition, which is already write-protected, of the eMMC during an upgrade process, the central processing unit of the smart device sends a write protection cancellation command to the eMMC, the eMMC cancels write protection of the read-only partition of the eMMC, and rewrites the data in the read-only partition of the eMMC, then the central processing unit of the smart device sends a write protection command to the eMMC, to perform write protection on the rewritten read-only partition of the eMMC again. Compared with the prior art, this embodiment can be effectively resolve a problem of abnormal rewriting of data in a read-only partition of an eMMC while ensuring that normal upgrading is not affected.

Embodiment 4

An objective of this embodiment of the present disclosure is to perform write protection control on a specified partition that needs write protection in an eMMC when a smart device is in a root state and the smart device upgrades the specified partition that needs write protection in the eMMC. The specified partition may be an entire read-only partition or a part of a read-only partition.

Figure 5:
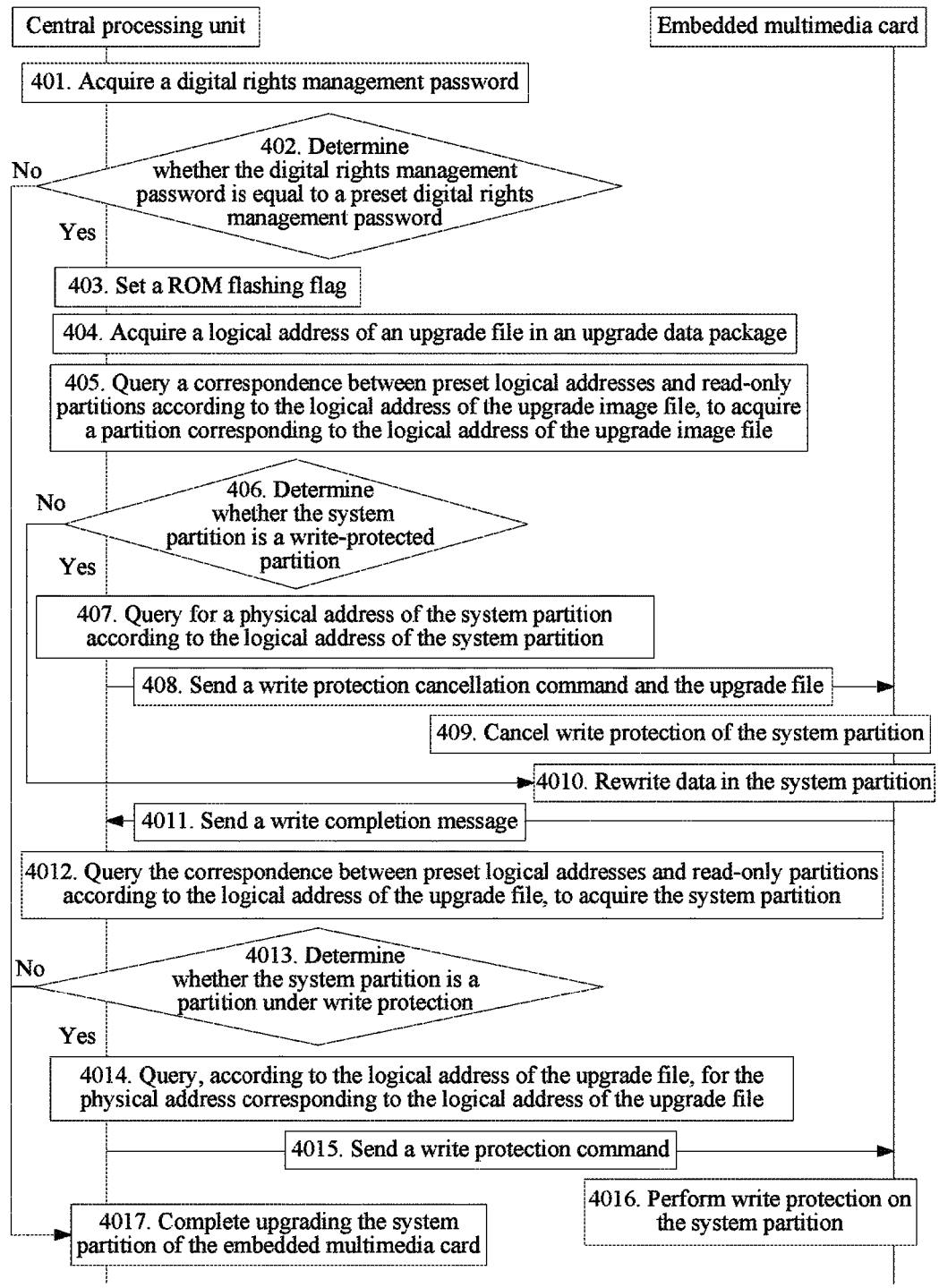
FIG. 5 is a flowchart of still yet another data processing method according to an embodiment of the present disclosure.

This embodiment of the present disclosure provides a data processing method, applied to a central processing unit and an eMMC, where a read-only partition is set in the eMMC. As shown in FIG. 5, the method includes the following steps:

Step 401: The central processing unit acquires a DRM password.

A user may acquire the DRM (WIDEVINE) password from the Internet using a smart device, and then enter the WIDEVINE password by means of fastboot.

Step 402: The central processing unit determines whether the DRM password is equal to a preset DRM password.

The preset DRM (WIDEVINE) password is stored in the central processing unit. If the DRM (WIDEVINE) password is equal to the preset DRM (WIDEVINE) password, the smart device locked using the WIDEVINE password is unlocked, and this case, the smart device is in a root state, and performs step 403.

If the DRM (WIDEVINE) password is not equal to the preset DRM (WIDEVINE) password, the process ends, and perform step 4017.

Step 403: The central processing unit sets a read-only memory (ROM) flashing flag.

The central processing unit may allow rewriting of data in a partition, such as data in a system partition, data in an engineering mode (Recovery) partition, or data in a CUST partition, and set the ROM flashing flag after the correct WIDEVINE password in entered by means of fastboot.

It should be noted that ROM flashing is a technical term for smart devices, and refers to using a certain method to modify or replace some languages, figures, ringtones, software, operating systems, or the like that are already in the smart devices, that is, reinstallation of systems of the smart devices. Improper deletion of some programs or files causes abnormalities in some functions of a smart device or even a startup failure. Therefore, when a smart device is not in a root state, after ROM flashing is performed on the smart device, a manufacturer of the smart device no longer provides a warranty service for a user that performs the ROM flashing.

Step 404: The central processing unit acquires a logical address of an upgrade file in an upgrade data package.

It should be noted that the upgrade data package includes at least one upgrade image file, a logical address of each upgrade image file, a file name of each upgrade image file, a version number of each upgrade image file, and other information.

Step 405: The central processing unit queries a correspondence between preset logical addresses and read-only partitions according to the logical address of the upgrade image file, to acquire a partition corresponding to the logical address of the upgrade image file.

A correspondence between all preset logical addresses of the eMMC and read-only partitions is stored in the central processing unit. The central processing unit first compares the logical address of the upgrade file with all the preset logical addresses of the eMMC that are stored in the central processing unit, to obtain a preset logical address that is equal to the logical address of the upgrade file, and then obtains a partition of the eMMC according to the correspondence between preset logical addresses and read-only partitions, that is, the partition is a partition corresponding to the logical address of the upgrade file.

It is assumed in this embodiment of the present disclosure that the upgrade file is application software, system, or application of a system partition.

Step 406: The central processing unit determines whether the system partition is a write-protected partition.

If the system partition is a write-protected partition, perform step 407.

If the system partition is not a write-protected partition, perform step 4010.

The central processing unit may determine, according to a partition number of the system partition, whether the partition is a partition that needs write protection, if the central processing unit determines, according to the partition number of the system partition, that the partition is a partition that needs write protection, the central processing unit determines whether the system partition is already write-protected, that is, the central processing unit determines whether the system partition is a write-protected partition.

Step 407: The central processing unit queries for a physical address of the system partition according to the logical address of the system partition.

A correspondence between the logical address of the system partition and the system partition is stored in the central processing unit. The central processing unit queries for the physical address of the system partition according to the logical address of the system partition.

Step 408: The central processing unit sends a write protection cancellation command and the upgrade file to the eMMC.

The write protection cancellation command includes the physical address of the system partition of the eMMC, a length used for executing the write protection cancellation command on the system partition, and a type of the write protection cancellation command. The write protection cancellation command may be CLR_WRITE_PROT. The length used for executing the write protection cancellation command on the system partition may be SEND_WRITE_PROT. The type of the write protection cancellation command may be SEND_WRITE_PROT TYPE. The type of the write protection cancellation command in the present disclosure is temporary cancellation of write protection.

Step 409: The eMMC cancels write protection of the system partition according to the write protection cancellation command sent by the central processing unit.

Step 4010: The eMMC rewrites data in the system partition.

The eMMC receives data transmitted by the central processing unit, rewrites the data in the system partition, and then sends a write completion message to the central processing unit.

Step 4011: The eMMC sends a write completion message to the central processing unit.

The write completion message includes the logical address of the system partition. The write completion message is a message indicating that the eMMC successfully writes the data in the upgrade file to the system partition.

Step 4012: The central processing unit queries the correspondence between preset logical addresses and read-only partitions according to the logical address of the upgrade file, to acquire the system partition.

The correspondence between all preset logical addresses of the eMMC and read-only partitions is stored in the central processing unit. The central processing unit first compares the logical address of the upgrade file with all the preset logical addresses of the eMMC that are stored in the central processing unit, to obtain a preset logical address that is equal to the logical address of the upgrade file, and then obtains the system partition of the eMMC according to the correspondence between preset logical addresses and read-only partitions, that is, the partition is a partition corresponding to the logical address of the upgrade file.

Step 4013: The central processing unit determines whether the system partition is a partition under write protection.

If the system partition is a partition under write protection, perform step 4014.

If the system partition is not a partition under write protection, perform step 4017.

The central processing unit may determine, according to the partition number of the partition corresponding to the logical address of the upgrade image file, whether the system partition is a partition that needs write protection, and if the central processing unit determines, according to the partition number of the partition corresponding to the logical address of the upgrade image file, that the system partition is a partition that needs write protection, the central processing unit determines whether the system partition is already write-protected, that is, the central processing unit determines whether the partition corresponding to the logical address of the upgrade image file is a write-protected partition.

Step 4014: The central processing unit queries, according to the logical address of the upgrade file, for the physical address corresponding to the logical address of the upgrade file.

The physical address corresponding to the logical address of the upgrade file is stored in the central processing unit. The central processing unit queries, according to the logical address of the upgrade file, for the physical address corresponding to the logical address of the upgrade file.

Step 4015: The central processing unit sends a write protection command to the eMMC.

The write protection command includes the physical address corresponding to the logical address of the upgrade file, a length used for executing the write protection command on the system partition, and a type of the write protection command. The write protection command may be SET_WRITE_PROT. The length used for executing the write protection command on the system partition may be SEND_WRITE_PROT. The type of the write protection command may be SEND_WRITE_PROT TYPE. The type of the write protection command in the present disclosure is temporary write protection.

Step 4016: The eMMC performs write protection on the system partition according to the write protection command sent by the central processing unit.

Step 4017: The central processing unit completes upgrading the system partition of the eMMC.

It should be noted that when the smart device is in the root state, the smart device still performs write protection on the Bootloader partition, and may allow cancellation of write protection of the system partition, the engineering mode (Recovery) partition, and the CUST partition. Step 4012 to step 4016 are optional steps.

According to the data processing method in this embodiment of the present disclosure, a central processing unit of a smart device sends a write protection command to an eMMC. The eMMC performs write protection on a read-only partition of the eMMC in advance, when the smart device is in a root state, a user may selectively delete, add, or modify data in the read-only partition of the eMMC. The central processing unit of the smart device sends a write protection cancellation command to the eMMC, the eMMC cancels write protection of a system partition, which is selected by the user, of the eMMC, rewrites data in the system partition of the eMMC. Then the central processing unit of the smart device sends a write protection command to the eMMC according to a requirement of the user, to perform write protection on the rewritten system partition of the eMMC again. Compared with the prior art, when a smart device is in a root state, after write protection of a system partition, which is already write-protected, of an eMMC is canceled, data in the system partition of the eMMC is rewritten, and then a write protection function of the eMMC is enabled for the system partition of the eMMC. Therefore, a problem of abnormal rewriting of data in a system partition in an eMMC can be effectively resolved while it is ensured that normal upgrading is not affected.

Embodiment 5

An objective of this embodiment of the present disclosure is to perform write protection control on a read-only partition that needs write protection in an eMMC of a smart device when a file in the read-only partition that needs write protection in the eMMC is mounted.

Figure 6:
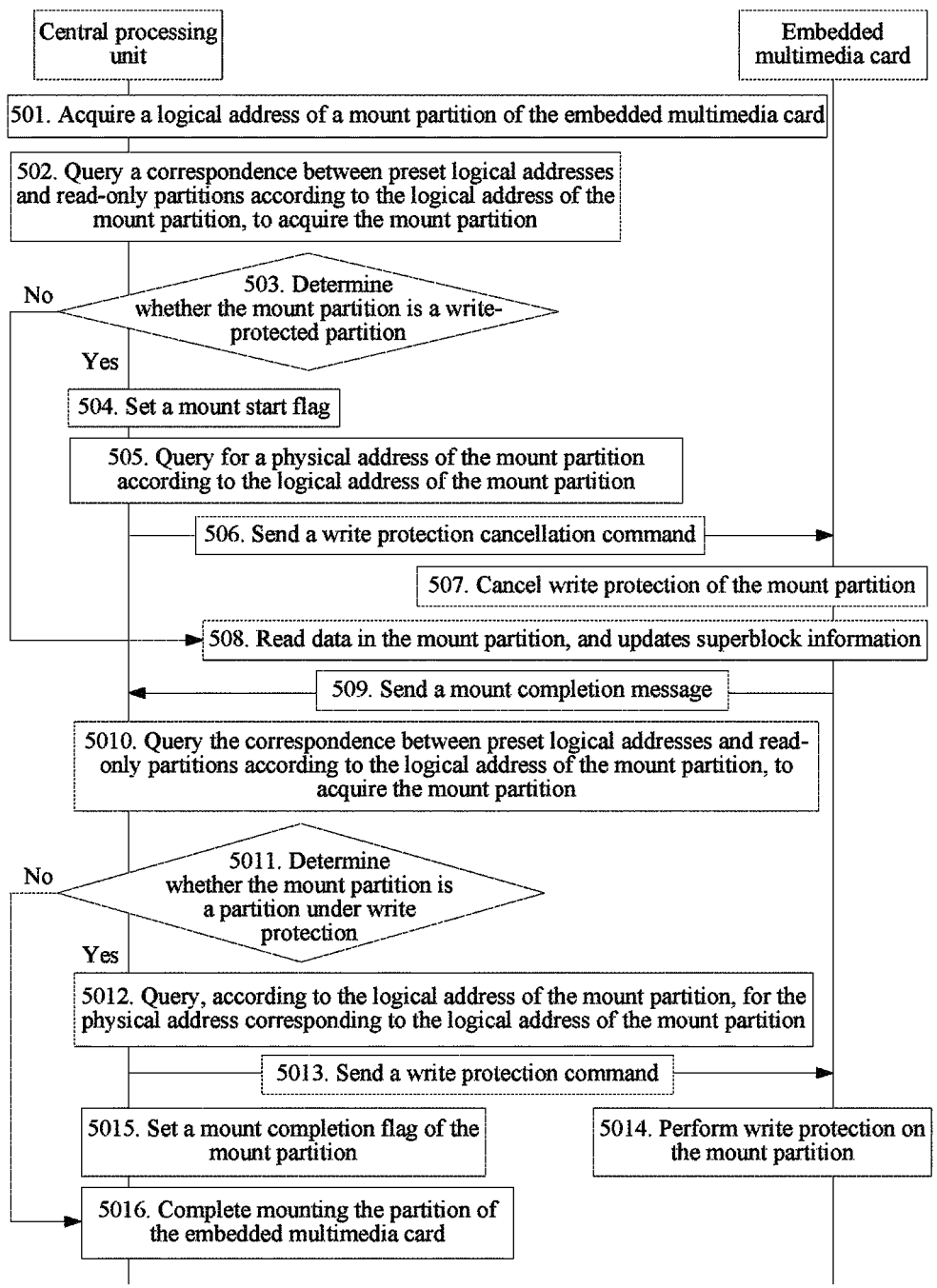
FIG. 6 is a flowchart of a further data processing method according to an embodiment of the present disclosure.

This embodiment of the present disclosure provides a data processing method, applied to a central processing unit and an eMMC. It is assumed that a smart device is currently in a startup state, and a partition of the eMMC is in a mount state. As shown in FIG. 6, the method includes the following steps:

Step 501: The central processing unit acquires a logical address of a mount partition of the eMMC.

Step 502: The central processing unit queries a correspondence between preset logical addresses and read-only partitions according to the logical address of the mount partition, to acquire the mount partition.

A correspondence between all preset logical addresses of the eMMC and read-only partitions is stored in the central processing unit. The central processing unit first compares the logical address of the mount partition with all the preset logical addresses of the eMMC that are stored in the central processing unit, to obtain a preset logical address that is equal to the logical address of the mount partition, and then obtains a partition of the eMMC according to the correspondence between preset logical addresses and read-only partitions, that is, the partition is a partition corresponding to the logical address of the mount partition.

Step 503: The central processing unit determines whether the mount partition is a write-protected partition.

If the mount partition is a write-protected partition, perform step 504.

If the mount partition is not a write-protected partition, perform step 508.

The central processing unit may determine, according to a partition number of the mount partition, whether the partition is a partition that needs write protection, if the central processing unit determines, according to the partition number of the mount partition, that the partition is a partition that needs write protection, the central processing unit determines whether the mount partition is already write-protected, that is, the central processing unit determines whether the partition corresponding to the logical address of the mount partition is a write-protected partition.

Step 504: The central processing unit sets a mount start flag.

The central processing unit sets the mount start flag for the mount partition. The mounting may refer to: when a file in a storage device is accessed, a partition in which the file is located needs to be mounted to an existing directory of the smart device, and then the storage device is accessed by accessing the directory.

Step 505: The central processing unit queries for a physical address of the mount partition according to the logical address of the mount partition.

Step 506: The central processing unit sends a write protection cancellation command to the eMMC.

The write protection cancellation command includes the physical address of the mount partition, a length used for executing the write protection cancellation command on the mount partition, and a type of the write protection cancellation command.

The write protection cancellation command may be CLR_WRITE_PROT. The length used for executing the write protection cancellation command on the read-only partition may be SEND_WRITE_PROT. The type of the write protection cancellation command may be SEND_WRITE_PROT TYPE. The type of the write protection cancellation command in the present disclosure is temporary cancellation of write protection.

Step 507: The eMMC cancels write protection of the mount partition according to the write protection cancellation command sent by the central processing unit.

After the eMMC receives the write protection cancellation command, a controller of the eMMC cancels write protection of the mount partition according to the write protection cancellation command.

Step 508: The eMMC reads data in the mount partition, and updates superblock (Super Block) information.

Step 509: The eMMC sends a mount completion message to the central processing unit.

The mount completion message includes the logical address of the mount partition.

Step 5010: The central processing unit queries the correspondence between preset logical addresses and read-only partitions according to the logical address of the mount partition, to acquire the mount partition.

The correspondence between all preset logical addresses of the eMMC and read-only partitions is stored in the central processing unit. The central processing unit first compares the logical address of the mount partition with all the preset logical addresses of the eMMC that are stored in the central processing unit, to obtain a preset logical address that is equal to the logical address of the mount partition, and then obtains a partition of the eMMC according to the correspondence between preset logical addresses and read-only partitions, that is, the partition is the mount partition.

Step 5011: The central processing unit determines whether the mount partition is a partition under write protection.

If the mount partition is a partition under write protection, perform step 5012.

If the mount partition is not a partition under write protection, perform step 5016.

The central processing unit may determine, according to the partition number of the mount partition, whether the partition is a partition that needs write protection, if the central processing unit determines, according to the partition number of the mount partition, that the partition is a partition that needs write protection, the central processing unit determines whether the mount partition is already write-protected, that is, the central processing unit determines whether the mount partition is a write-protected partition.

Step 5012: The central processing unit queries, according to the logical address of the mount partition, for the physical address corresponding to the logical address of the mount partition.

The physical address corresponding to the logical address of the mount partition is stored in the central processing unit. The central processing unit queries, according to the logical address of the mount partition, for the physical address corresponding to the logical address of the mount partition.

Step 5013: The central processing unit sends a write protection command to the eMMC.

The write protection command includes the physical address corresponding to the logical address of the mount partition, a length used for executing the write protection command on the mount partition, and a type of the write protection command.

The write protection command may be SET_WRITE_PROT. The length used for executing the write protection command on the mount partition may be SEND_WRITE_PROT. The type of the write protection command may be SEND_WRITE_PROT TYPE. The type of the write protection command in the present disclosure is temporary write protection.

Step 5014: The eMMC performs write protection on the mount partition according to the write protection command sent by the central processing unit.

Step 5015: The central processing unit sets a mount completion flag of the mount partition.

Step 5016: The central processing unit completes mounting the partition of the eMMC.

In this embodiment of the present disclosure, the mount start flag and the mount completion flag are used to monitor an abnormal power failure of the smart device.

It should be noted that when the smart device is in the root state, the read-only partition of the eMMC may be in the mount state, and the central processing unit needs to set a mount flag for the read-only partition of the eMMC, and set a mount completion flag after performing rewriting in the read-only partition of the eMMC. In this way, if a power failure occurs when rewriting is performed in the read-only partition of the eMMC, the eMMC may determine whether the power failure is an abnormal power failure according to the mount flag, and may reset write protection of the read-only partition the that needs write protection in the eMMC according to the write protection command sent by the central processing unit, so as to effectively prevent abnormal rewriting of data in the read-only partition when the read-only partition that needs write protection in the eMMC is not write-protected.

It should be noted that after the method in any embodiment of Embodiment 1 to Embodiment 4 of the present disclosure, the present disclosure further includes the method in Embodiment 5.

Embodiment 6

An objective of this embodiment of the present disclosure lies in that a smart device records a write protection state of a read-only partition that needs write protection in an eMMC.

Figure 7:
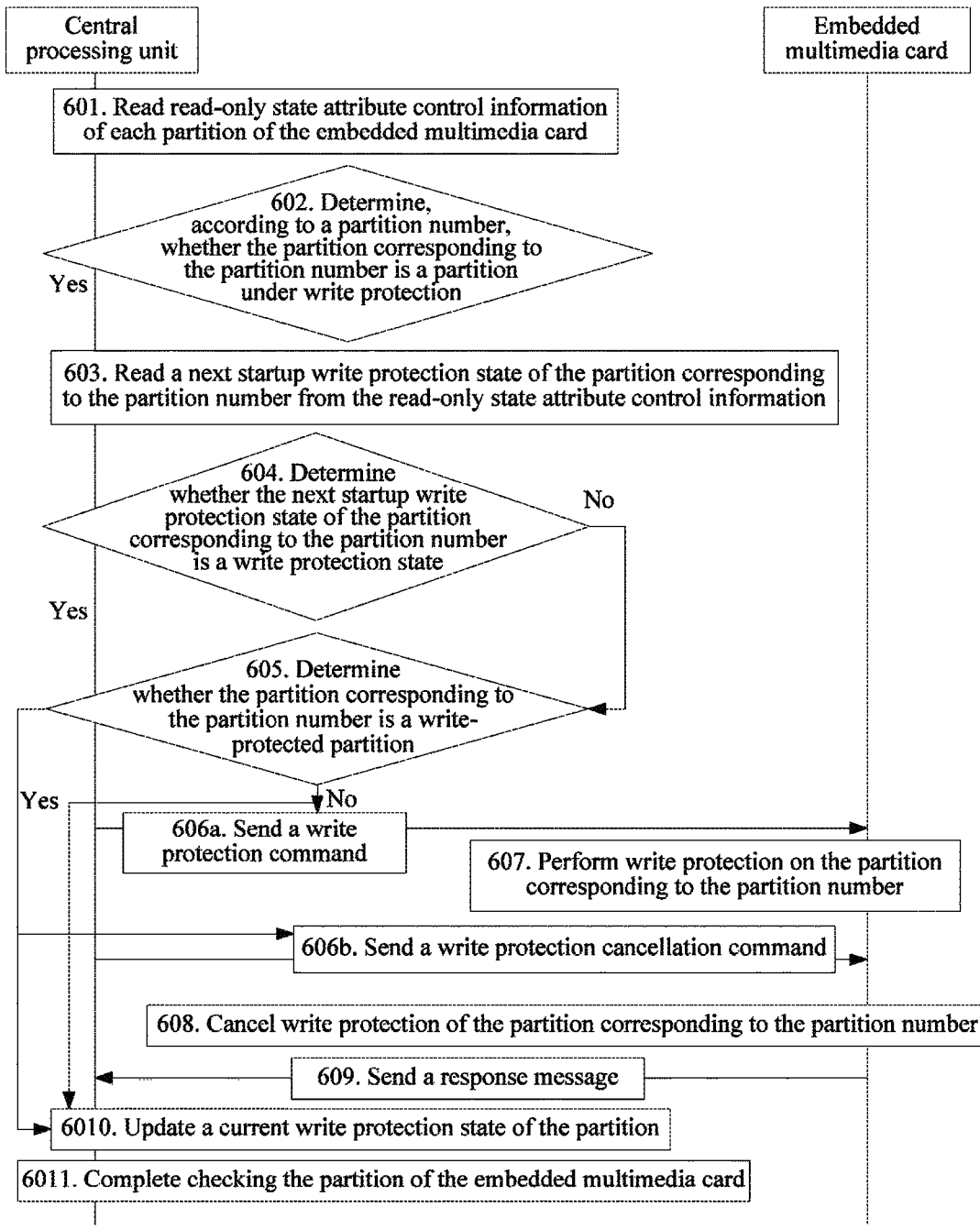
FIG. 7 is a flowchart of a still further data processing method according to an embodiment of the present disclosure.

This embodiment of the present disclosure provides a data processing method, applied to a central processing unit and an eMMC. As shown in FIG. 7, the method includes the following steps:

Step 601: The central processing unit reads read-only state attribute control information of each partition of the eMMC.

The read-only state attribute control information includes a partition number, a write protection attribute of the partition, a next startup write protection state of the partition, and a current write protection state of the partition. The read-only state attribute control information may be included in a miscellaneous partition. The partition number may be an identifier of the partition of the eMMC. The write protection attribute of the partition is used to indicate whether the partition of the eMMC is write-protected or not write-protected. The next startup write protection state of the partition is used to indicate whether the partition of the eMMC is write-protected or not write-protected when a smart device starts up next time. The next startup write protection state of the partition may be preset to a write protection state or a non-write protection state. The current write protection state of the partition indicates whether the partition of the eMMC is currently in a write protection state or a non-write protection state.

For the read-only state attribute control information of each partition of the smart device, a read-only attribute of each partition may be recorded using a read-only state attribute structure. A definition is as follows:

```
struct partition_info
{
  int parti_no;             //the partition number
  int parti_rw_protection;  //the write protection attribute of the partition
  int parti_rw_status_poweron;  //the next startup write protection state of the partition
  int parti_rw_status;      //the current write protection state of the partition
}
```

Step 602: The central processing unit determines, according to the partition number, whether the partition corresponding to the partition number is a partition under write protection.

The central processing unit reads the write protection attribute of the partition corresponding to the partition number from the read-only state attribute control information, and determines whether the partition corresponding to the partition number is a partition under write protection.

If the partition corresponding to the partition number is partition under write protection, perform step 603.

A partition under write protection may be a read-only partition, for example, a system partition, an engineering mode partition, or a CUST partition, a partition that is not under write protection may be a readable-writable partition, for example, a user data partition, or a U-disk partition.

Step 603: The central processing unit reads the next startup write protection state of the partition corresponding to the partition number from the read-only state attribute control information.

A user may independently set the next startup write protection state of the partition.

Step 604: The central processing unit determines whether the next startup write protection state of the partition corresponding to the partition number is a write protection state.

If the next startup write protection state of the partition corresponding to the partition number is the write protection state, or if the next startup write protection state of the partition corresponding to the partition number is not the write protection state, perform step 605.

Step 605: The central processing unit determines whether the partition corresponding to the partition number is a write-protected partition.

The central processing unit reads the current write protection state of the partition corresponding to the partition number from the read-only state attribute control information, and determines whether the partition corresponding to the partition number is a write-protected partition.

When the next startup write protection state of the partition corresponding to the partition number is the write protection state, if the partition corresponding to the partition number is not a write-protected partition, perform step 606a, if the partition corresponding to the partition number is a write-protected partition, perform step 6010.

When the next startup write protection state of the partition corresponding to the partition number is not the write protection state, if the partition corresponding to the partition number is not a write-protected partition, perform step 6010, if the partition corresponding to the partition number is a write-protected partition, perform step 606b.

Step 606a: The central processing unit sends a write protection command to the eMMC. Then step 607 is performed.

The write protection command includes a physical address of a mount partition.

Step 607: The eMMC performs, according to the write protection command sent by the central processing unit, write protection on the partition corresponding to the partition number. Then step 609 is performed.

Step 606b: The central processing unit sends a write protection cancellation command to the eMMC. Then step 608 is performed.

The write protection cancellation command includes the physical address of the mount partition.

Step 608: The eMMC cancels, according to the write protection cancellation command sent by the central processing unit, write protection of the partition corresponding to the partition number. Then step 609 is performed.

Step 609: The eMMC sends a response message to the central processing unit. Then step 6010 is performed.

When the eMMC performs, according to the write protection command sent by the central processing unit, write protection on the partition corresponding to the partition number, the eMMC sends a response message to the central processing unit, where the response message includes a write protection completion response.

When the eMMC cancels, according to the write protection cancellation command sent by the central processing unit, write protection of the partition corresponding to the partition number, the eMMC sends a response message to the central processing unit, where the response message includes a write protection cancellation completion response.

Step 6010: The central processing unit updates the current write protection state of the partition. Then step 6011 is performed.

When the next startup write protection state of the partition corresponding to the partition number is the write protection state, the central processing unit updates the current write protection state of the partition to the write protection state.

When the next startup write protection state of the partition corresponding to the partition number is not the write protection state, the central processing unit updates the current write protection state of the partition to the non-write protection state.

Step 6011: The central processing unit completes checking the partition of the eMMC.

According to the data processing method in this embodiment of the present disclosure, read-only state attribute control information of each partition of an eMMC is set, to monitor write protection states of all the partitions of the eMMC, and each time after a smart device rewrites data in a partition of the eMMC, the smart device updates a current write protection state of the partition. Compared with the prior art, a write protection function of an eMMC is enabled, to perform write protection on a partition of the eMMC, and then write protection states of all partitions of the eMMC are monitored in real time, this embodiment can effectively prevent abnormal rewriting of data in the partition of the eMMC.

It should be noted that in the data processing method in the present disclosure, the canceling, by the eMMC, write protection of the partition according to the write protection cancellation command includes, when a high-pass port of the central processing unit of the smart device forcibly loads a mode, forcibly performing rewriting in the partition of the eMMC, upgrading data in the partition of the eMMC, DRM (WIDEVINE) password unlocking, modifying superblock (Super Block) information of a mount partition or an umount partition, and the smart device is in a root state, and the performing, by the eMMC, write protection on the partition according to the write protection command includes normally starting a burned version of the smart device, normally starting an upgraded version of the smart device, DRM (WIDEVINE) password locking, in a partition mount (mount) or umount (umount) process, and after the smart device restarts.

According to the data processing method in the present disclosure, a smart device enables a write protection function of an eMMC, to perform write protection on a partition of the eMMC, in a normal upgrade process of the smart device or when the smart device is in a root state, write protection of the partition of the eMMC is canceled, to rewrite data in the partition of the eMMC, then the write protection function of the eMMC is enabled for the partition of the eMMC, which can effectively prevent a hacker or an enthusiast from abnormally rewriting data in the partition of the eMMC in the root state or abnormally rewriting data in the partition of the eMMC in a case in which there is a flaw in a program stored in the smart device.

Embodiment 7

Figure 8:
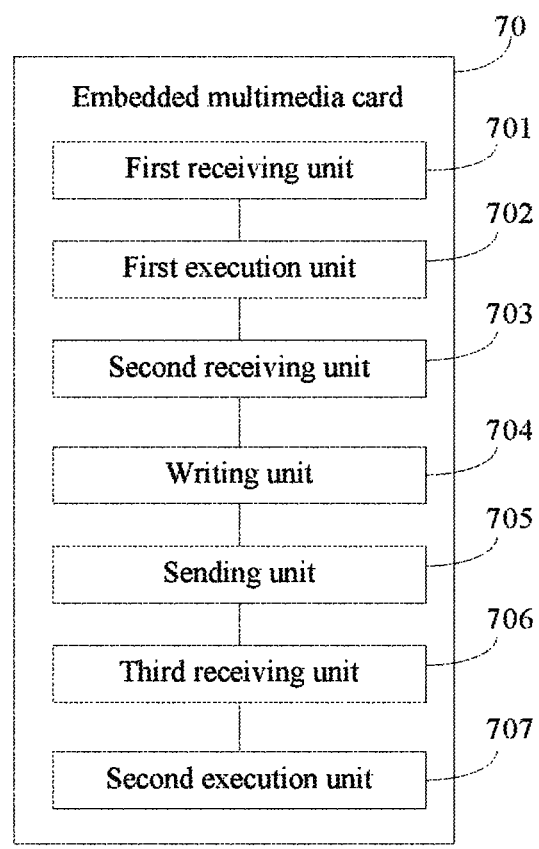
FIG. 8 is a schematic structural diagram of an eMMC according to an embodiment of the present disclosure.

This embodiment of the present disclosure provides an eMMC 70. As shown in FIG. 8, the eMMC 70 includes a read-only partition, and includes a first receiving unit 701, configured to receive a write protection cancellation command sent by a central processing unit, a first execution unit 702, configured to execute the write protection cancellation command on a specified partition that is in the read-only partition and that is used to store an upgrade file, a second receiving unit 703, configured to receive the upgrade file sent by the central processing unit, a writing unit 704, configured to write the upgrade file to the specified partition, a sending unit 705, configured to after the writing of the upgrade file is completed, send a write completion message to the central processing unit, a third receiving unit 706, configured to receive a write protection command sent by the central processing unit, and a second execution unit 707, configured to execute the write protection command on the specified partition.

In this way, before rewriting data in a specified partition of an eMMC, the eMMC of a smart device executes a write protection cancellation command on the specified partition of an upgrade file, then the eMMC writes the upgrade file to the specified partition, and the eMMC executes a write protection command on the specified partition. Compared with the prior art, this embodiment can be effectively resolve a problem of abnormal rewriting of data in a specified partition of an eMMC while ensuring that normal upgrading is not affected.

Figure 9:
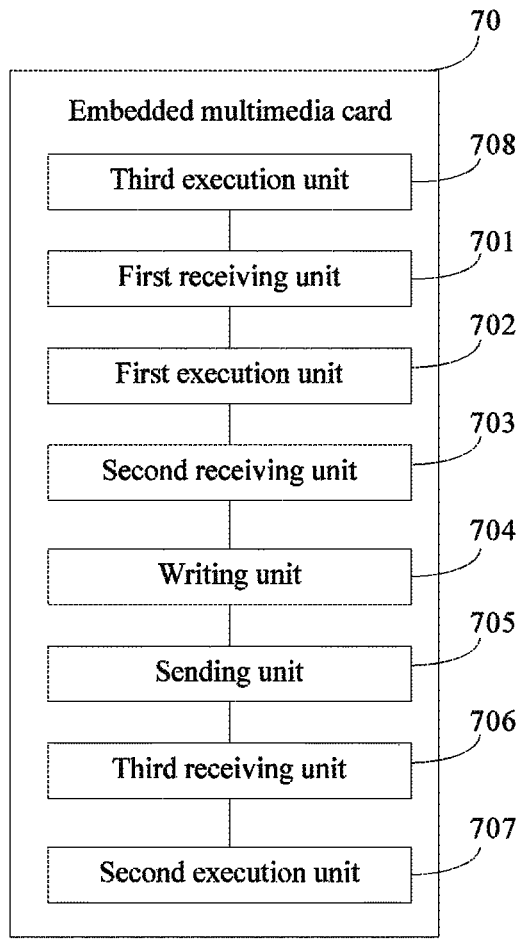
FIG. 9 is a schematic structural diagram of another eMMC according to an embodiment of the present disclosure.

As shown in FIG. 9, the eMMC 70 further includes a third execution unit 708, configured to execute a write protection command sent by the central processing unit on the read-only partition that needs write protection.

The write protection cancellation command includes a physical address and a length used for executing the write protection cancellation command on the specified partition, the write protection command includes the physical address and a length used for executing the write protection command on the specified partition, and the physical address is a physical address to which the upgrade file needs to be written in the eMMC.

Embodiment 8

Figure 10:
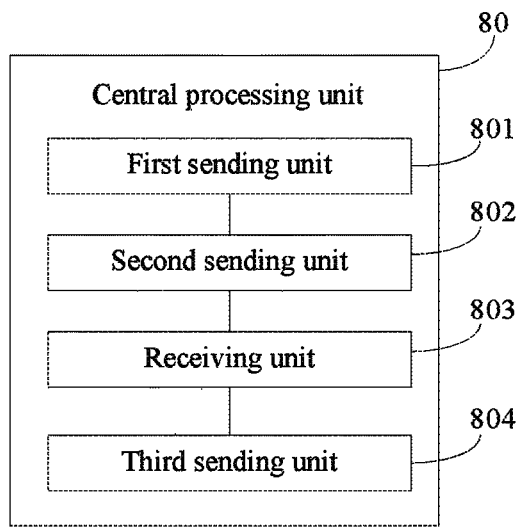
FIG. 10 is a schematic structural diagram of a central processing unit according to an embodiment of the present disclosure.

This embodiment of the present disclosure provides a central processing unit 80, as shown in FIG. 10, including a first sending unit 801, configured to send a write protection cancellation command to an eMMC, where the eMMC includes a read-only partition in a write protection state, a second sending unit 802, configured to send an upgrade file to the eMMC, a receiving unit 803, configured to receive a write completion message sent by the eMMC, where the write completion message includes a logical address of the upgrade file, and the write completion message is a message indicating that the eMMC successfully writes the upgrade file to a specified partition of the upgrade file, and a third sending unit 804, configured to send a write protection command to the eMMC.

In this way, before data in a specified partition of an eMMC is rewritten, a write protection cancellation command and an upgrade file are first sent to the eMMC, so that the eMMC of a smart device executes the write protection cancellation command on the specified partition of the upgrade file and writes the upgrade file to the specified partition, after a write completion message sent by the eMMC is received, a write protection command is sent to the eMMC, to perform write protection on the specified partition again. Compared with the prior art, this embodiment can be effectively resolve a problem of abnormal rewriting of data in a specified partition of an eMMC while ensuring that normal upgrading is not affected.

Figure 11:
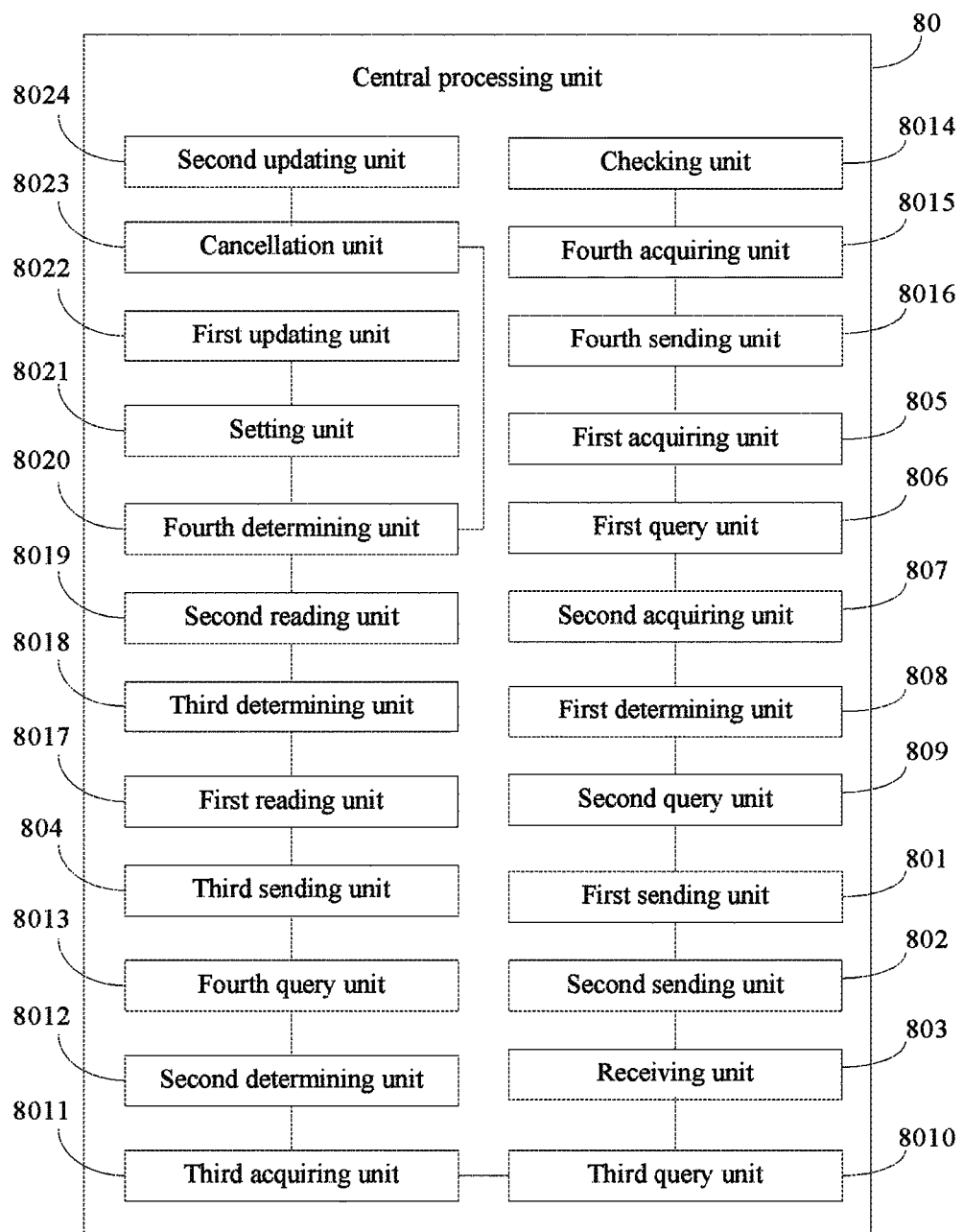
FIG. 11 is a schematic structural diagram of another central processing unit according to an embodiment of the present disclosure.

As shown in FIG. 11, the central processing unit 80 further includes a first acquiring unit 805, configured to acquire the logical address of the upgrade file in an upgrade data package, where the upgrade data package includes at least one upgrade file and a logical address of each upgrade file, a first query unit 806, configured to query a correspondence between preset logical addresses and read-only partitions according to the logical address of the upgrade file, a second acquiring unit 807, configured to acquire the specified partition of the upgrade file, a first determining unit 808, configured to determine whether the specified partition of the upgrade file is a write-protected partition, a second query unit 809, configured to, if the specified partition of the upgrade file is a write-protected partition, query, according to the logical address of the upgrade file, for a physical address corresponding to the logical address of the upgrade file, where the physical address is a physical address to which the upgrade file needs to be written in the eMMC, a third query unit 8010, configured to query the correspondence between preset logical addresses and read-only partitions according to the logical address of the upgrade file, a third acquiring unit 8011, configured to acquire the specified partition of the upgrade file, a second determining unit 8012, configured to determine whether the specified partition of the upgrade file is a partition under write protection, a fourth query unit 8013, configured to, if the specified partition of the upgrade file is a partition under write protection, query, according to the logical address of the upgrade file, for the physical address corresponding to the logical address of the upgrade file, where the write protection cancellation command includes the physical address and a length used for executing the write protection cancellation command on the specified partition, and the write protection command includes the physical address and a length used for executing the write protection command on the specified partition, a checking unit 8014, configured to check whether a power failure protection identifier is an abnormal power failure identifier, a fourth acquiring unit 8015, configured to if the power failure protection identifier is an abnormal power failure identifier, acquire a physical address corresponding to a logical address of the read-only partition that needs write protection in the eMMC, and a fourth sending unit 8016, configured to send a write protection command to the eMMC, where the write protection command includes the physical address and a length used for executing the write protection command on the read-only partition, a first reading unit 8017, configured to read read-only state attribute control information of each partition of the eMMC, where the read-only state attribute control information includes a partition number, a write protection attribute of the partition, a next startup write protection state of the partition, and a current write protection state of the partition, a third determining unit 8018, configured to determine, according to the partition number, whether the partition corresponding to the partition number is a partition under write protection, a second reading unit 8019, configured to, if the partition corresponding to the partition number is a partition under write protection, read the next startup write protection state of the partition corresponding to the partition number from the read-only state attribute control information, a fourth determining unit 8020, configured to determine whether the next startup write protection state of the partition corresponding to the partition number is the write protection state, where the fourth determining unit 8020 is further configured to, if the next startup write protection state of the partition corresponding to the partition number is the write protection state, determine whether the partition corresponding to the partition number is a write-protected partition, a setting unit 8021, configured to, if the partition corresponding to the partition number is not a write-protected partition, set the partition to a write-protected partition, a first updating unit 8022, configured to update the current write protection state of the partition to the write protection state, where the first updating unit 8022 is further configured to, if the partition corresponding to the partition number is a write-protected partition, update the current write protection state of the partition, the fourth determining unit 8020 is configured to determine whether the next startup write protection state of the partition corresponding to the partition number is the write protection state, the fourth determining unit 8020 is configured to, if the next startup write protection state of the partition corresponding to the partition number is not the write protection state, determine whether the partition corresponding to the partition number is a write-protected partition, a cancellation unit 8023, configured to, if the partition corresponding to the partition number is a write-protected partition, cancel write protection of the partition, and a second updating unit 8024, configured to update the current write protection state of the partition, where the second updating unit 8024 is further configured to, if the partition corresponding to the partition number is not a write-protected partition, update the current write protection state of the partition.

Embodiment 9

Figure 12:
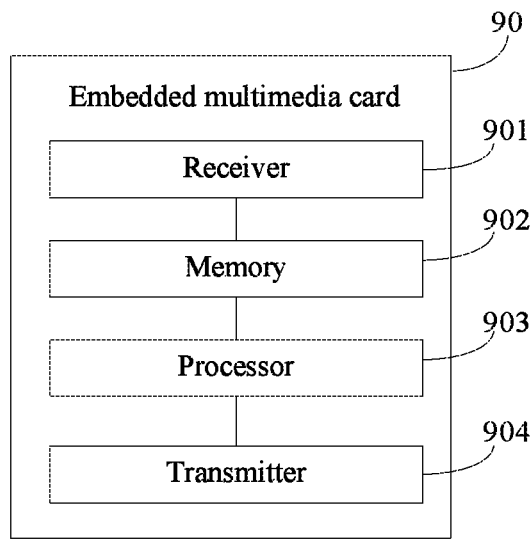
FIG. 12 is a schematic structural diagram of still another eMMC according to an embodiment of the present disclosure.

This embodiment of the present disclosure provides an eMMC 90. The eMMC 90 includes a read-only partition. As shown in FIG. 12, the eMMC includes a receiver 901, configured to receive a write protection cancellation command sent by a central processing unit, a memory 902, used to store program code, a processor 903, configured to invoke the program code stored in the memory, to execute the following method: executing the write protection cancellation command on a specified partition that is in the read-only partition and that is used to store an upgrade file, where the receiver 901 is further configured to receive the upgrade file sent by the central processing unit, and the processor 903 is further configured to write the upgrade file to the specified partition, and a transmitter 904, configured to, after the writing of the upgrade file is completed, send a write completion message to the central processing unit, where the receiver 901 is further configured to receive a write protection command sent by the central processing unit, and the processor 903 is further configured to execute the write protection command on the specified partition.

In this way, before rewriting data in a specified partition of an eMMC, the eMMC of a smart device executes a write protection cancellation command on the specified partition of an upgrade file, then the eMMC writes the upgrade file to the specified partition, and the eMMC executes a write protection command on the specified partition. Compared with the prior art, this embodiment can be effectively resolve a problem of abnormal rewriting of data in a specified partition of an eMMC while ensuring that normal upgrading is not affected.

The processor 903 is further configured to execute a write protection command sent by the central processing unit on the read-only partition that needs write protection.

The write protection cancellation command includes a physical address and a length used for executing the write protection cancellation command on the specified partition, the write protection command includes the physical address and a length used for executing the write protection command on the specified partition, and the physical address is a physical address to which the upgrade file needs to be written in the eMMC.

Embodiment 10

Figure 13:
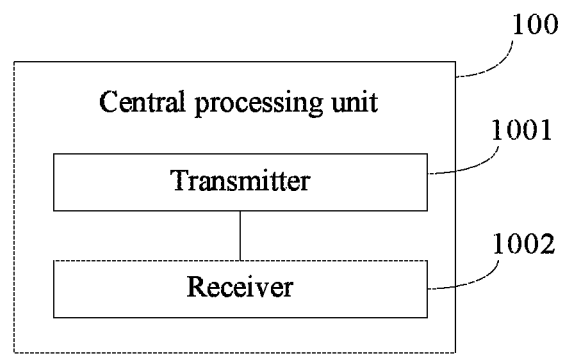
FIG. 13 is a schematic structural diagram of still another central processing unit according to an embodiment of the present disclosure.

This embodiment of the present disclosure provides a central processing unit 100, as shown in FIG. 13, including a transmitter 1001, configured to send a write protection cancellation command to an eMMC, where the eMMC includes a read-only partition in a write protection state, where the transmitter 1001 is further configured to send an upgrade file to the eMMC, and a receiver 1002, configured to receive a write completion message sent by the eMMC, where the write completion message includes a logical address of the upgrade file, and the write completion message is a message indicating that the eMMC successfully writes the upgrade file to a specified partition of the upgrade file, where the transmitter 1001 is further configured to send a write protection command to the eMMC.

In this way, before data in a specified partition of an eMMC is rewritten, a write protection cancellation command and an upgrade file are first sent to the eMMC, so that the eMMC of a smart device executes the write protection cancellation command on the specified partition of the upgrade file and writes the upgrade file to the specified partition, after a write completion message sent by the eMMC is received, a write protection command is sent to the eMMC, to perform write protection on the specified partition again. Compared with the prior art, this embodiment can be effectively resolve a problem of abnormal rewriting of data in a specified partition of an eMMC while ensuring that normal upgrading is not affected.

Figure 14:
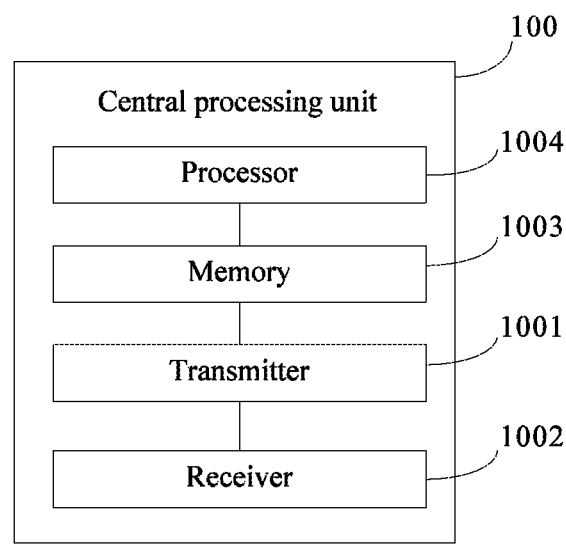
FIG. 14 is a schematic structural diagram of yet another central processing unit according to an embodiment of the present disclosure.

As shown in FIG. 14, the central processing unit 100 further includes a memory 1003, used to store program code, a processor 1004, configured to invoke the program code stored in the memory, to execute the following method: acquiring the logical address of the upgrade file in an upgrade data package, where the upgrade data package includes at least one upgrade file and a logical address of each upgrade file, querying a correspondence between preset logical addresses and read-only partitions according to the logical address of the upgrade file, acquiring the specified partition of the upgrade file determining whether the specified partition of the upgrade file is a write-protected partition, and if the specified partition of the upgrade file is a write-protected partition, querying, according to the logical address of the upgrade file, for a physical address corresponding to the logical address of the upgrade file, where the physical address is a physical address to which the upgrade file needs to be written in the eMMC.

The processor 1004 is further configured to query the correspondence between preset logical addresses and read-only partitions according to the logical address of the upgrade file, acquire the specified partition of the upgrade file, determine whether the specified partition of the upgrade file is a partition under write protection, and if the specified partition of the upgrade file is a partition under write protection, query, according to the logical address of the upgrade file, for the physical address corresponding to the logical address of the upgrade file.

The write protection cancellation command includes the physical address and a length used for executing the write protection cancellation command on the specified partition, and the write protection command includes the physical address and a length used for executing the write protection command on the specified partition.

The processor 1004 is further configured to check whether a power failure protection identifier is an abnormal power failure identifier, and if the power failure protection identifier is an abnormal power failure identifier, acquire a physical address corresponding to a logical address of the read-only partition that needs write protection in the eMMC, and the transmitter is further configured to send a write protection command to the eMMC, where the write protection command includes the physical address and a length used for executing the write protection command on the read-only partition.

The processor 1004 is further configured to read read-only state attribute control information of each partition of the eMMC, where the read-only state attribute control information includes a partition number, a write protection attribute of the partition, a next startup write protection state of the partition, and a current write protection state of the partition, determine, according to the partition number, whether the partition corresponding to the partition number is a partition under write protection, and if the partition corresponding to the partition number is a partition under write protection, read the next startup write protection state of the partition corresponding to the partition number from the read-only state attribute control information.

The processor 1004 is further configured to determine whether the next startup write protection state of the partition corresponding to the partition number is the write protection state, if the next startup write protection state of the partition corresponding to the partition number is the write protection state, determine whether the partition corresponding to the partition number is a write-protected partition, if the partition corresponding to the partition number is not a write-protected partition, set the partition to a write-protected partition, and update the current write protection state of the partition to the write protection state, and if the partition corresponding to the partition number is a write-protected partition, update the current write protection state of the partition.

The processor 1004 is further configured to determine whether the next startup write protection state of the partition corresponding to the partition number is the write protection state, if the next startup write protection state of the partition corresponding to the partition number is not the write protection state, determine whether the partition corresponding to the partition number is a write-protected partition, if the partition corresponding to the partition number is a write-protected partition, cancel write protection of the partition, and update the current write protection state of the partition, and if the partition corresponding to the partition number is not a write-protected partition, update the current write protection state of the partition.

Embodiment 11

Figure 15:
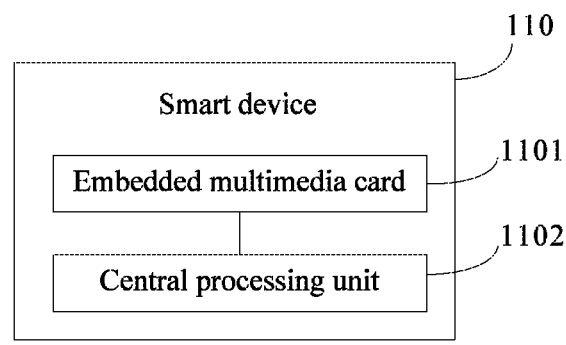
FIG. 15 is a schematic structural diagram of a smart device according to an embodiment of the present disclosure.

This embodiment of the present disclosure provides a smart device 110, as shown in FIG. 15, including an eMMC 1101 and a central processing unit 1102.

The eMMC 1101 is configured to receive a write protection cancellation command sent by the central processing unit, execute the write protection cancellation command on a specified partition that is in a read-only partition and that is used to store an upgrade file, receive the upgrade file sent by the central processing unit, write the upgrade file to the specified partition, after completing writing the upgrade file, send a write completion message to the central processing unit, receive a write protection command sent by the central processing unit, and execute the write protection command on the specified partition.

The central processing unit 1102 is configured to send the write protection cancellation command to the eMMC, where the eMMC includes the read-only partition in a write protection state, send the upgrade file to the eMMC, receive the write completion message sent by the eMMC, where the write completion message includes a logical address of the upgrade file, and the write completion message is a message indicating that the eMMC successfully writes the upgrade file to the specified partition of the upgrade file, and send the write protection command to the eMMC.

It may be clearly understood by a person skilled in the art that, for the purpose of convenient and brief description, for a detailed working process of the foregoing apparatus and unit, reference may be made to a corresponding process in the foregoing method embodiments, and details are not described herein again.

In the several embodiments provided in the present application, it should be understood that the disclosed apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software functional unit.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes any medium that can store program code, such as a ROM, a random access memory (RAM), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A data processing method applied to a central processing unit, comprising:
    acquiring a logical address of an upgrade file in an upgrade data package, wherein the upgrade data package comprises the upgrade file and a logical address of the upgrade file;
    querying a correspondence between preset logical addresses and read-only partitions according to the logical address of the upgrade file;
    acquiring a specified partition of the upgrade file;
    determining whether the specified partition of the upgrade file is a write-protected partition;
    querying for a physical address corresponding to the logical address of the upgrade file according to the logical address of the upgrade file in response to determining that the specified partition of the upgrade file is a write-protected partition, wherein the physical address is a physical address to which the upgrade file needs to be written in an embedded multimedia card;
    sending a write protection cancellation command to the embedded multimedia card, wherein the embedded multimedia card comprises a read-only partition in a write protection state;
    sending the upgrade file to the embedded multimedia card;
    receiving a write completion message sent by the embedded multimedia card, wherein the write completion message comprises the logical address of the upgrade file, and wherein the write completion message is a message indicating that the embedded multimedia card successfully writes the upgrade file to the specified partition of the upgrade file; and
    sending a write protection command to the embedded multimedia card.

2. The data processing method according to claim 1, wherein after receiving the write completion message sent by the embedded multimedia card, the method further comprises:
    querying the correspondence between preset logical addresses and read-only partitions according to the logical address of the upgrade file;
    acquiring the specified partition of the upgrade file;
    determining whether the specified partition of the upgrade file is a partition under write protection; and
    querying, for the physical address corresponding to the logical address of the upgrade file according to the logical address of the upgrade file in response to determining that the specified partition of the upgrade file is a partition under write protection.

3. The data processing method according to claim 1, wherein the write protection cancellation command comprises the physical address and a length used for executing the write protection cancellation command on the specified partition, and wherein the write protection command comprises the physical address and a length used for executing the write protection command on the specified partition.

4. The data processing method according to claim 3, wherein before acquiring the logical address of the upgrade file in the upgrade data package, the method further comprises:
    checking whether a power failure protection identifier is an abnormal power failure identifier;
    acquiring a physical address corresponding to a logical address of the read-only partition that needs write protection in the embedded multimedia card in response to determining that the power failure protection identifier is an abnormal power failure identifier; and
    sending a write protection command to the embedded multimedia card, wherein the write protection command comprises the physical address and a length used for executing the write protection command on the read-only partition.

5. The data processing method according to claim 1, wherein after sending the write protection command to the embedded multimedia card, the method further comprises:
    reading read-only state attribute control information of each partition of the embedded multimedia card, wherein the read-only state attribute control information comprises a partition number, a write protection attribute of the partition, a next startup write protection state of the partition, and a current write protection state of the partition;

determining whether the partition corresponding to the partition number is a partition under write protection according to the partition number; and reading the next startup write protection state of the partition corresponding to the partition number from the read-only state attribute control information in response to determining that the partition corresponding to the partition number is a partition under write protection.

6. The data processing method according to claim 5, wherein after reading the next startup write protection state of the partition corresponding to the partition number from the read-only state attribute control information, the method further comprises:

determining whether the next startup write protection state of the partition corresponding to the partition number is the write protection state;

determining whether the partition corresponding to the partition number is a write-protected partition in response to determining that the next startup write protection state of the partition corresponding to the partition number is the write protection state;

setting the partition to a write-protected partition in response to determining that the partition corresponding to the partition number is not a write-protected partition; and updating the current write protection state of the partition to the write protection state; and updating the current write protection state of the partition in response to determining that the partition corresponding to the partition number is a write-protected partition.

7. The data processing method according to claim 6, wherein after reading the next startup write protection state of the partition corresponding to the partition number from the read-only state attribute control information, the method further comprises:

determining whether the next startup write protection state of the partition corresponding to the partition number is the write protection state;

determining whether the partition corresponding to the partition number is a write-protected partition in response to determining that the next startup write protection state of the partition corresponding to the partition number is not the write protection state;

canceling write protection of the partition in response to determining that the partition corresponding to the partition number is a write-protected partition; and updating the current write protection state of the partition; and updating the current write protection state of the partition in response to determining that the partition corresponding to the partition number is not a write-protected partition.

8. A device, comprising:
at least one processor; and
a non-transitory computer-readable storage medium coupled to the at least one processor and storing programming instructions for execution by the at least one processor, the programming instructions instructing the at least one processor to perform operations comprising:

acquiring a logical address of an upgrade file in an upgrade data package, wherein the upgrade data package comprises the upgrade file and a logical address of the upgrade file;

querying a correspondence between preset logical addresses and read-only partitions according to the logical address of the upgrade file;

acquiring a specified partition of the upgrade file;

determining whether the specified partition of the upgrade file is a write-protected partition;

querying for a physical address corresponding to the logical address of the upgrade file according to the logical address of the upgrade file in response to determining that the specified partition of the upgrade file is a write-protected partition, wherein the physical address is a physical address to which the upgrade file needs to be written in an embedded multimedia card;

sending a write protection cancellation command to the embedded multimedia card, wherein the embedded multimedia card comprises a read-only partition in a write protection state;

sending the upgrade file to the embedded multimedia card;

receiving a write completion message sent by the embedded multimedia card, wherein the write completion message comprises the logical address of the upgrade file, and wherein the write completion message is a message indicating that the embedded multimedia card successfully writes the upgrade file to the specified partition of the upgrade file; and sending a write protection command to the embedded multimedia card.

9. The device according to claim 8, wherein the operations comprise:

querying the correspondence between preset logical addresses and read-only partitions according to the logical address of the upgrade file;

acquiring the specified partition of the upgrade file;

determining whether the specified partition of the upgrade file is a partition under write protection; and querying, for the physical address corresponding to the logical address of the upgrade file according to the logical address of the upgrade file in response to determining that the specified partition of the upgrade file is a partition under write protection.

10. The device according to claim 8, wherein the write protection cancellation command comprises the physical address and a length used for executing the write protection cancellation command on the specified partition, and wherein the write protection command comprises the physical address and a length used for executing the write protection command on the specified partition.

11. The device according to claim 10, wherein the operations comprise:

checking whether a power failure protection identifier is an abnormal power failure identifier;

acquiring a physical address corresponding to a logical address of the read-only partition that needs write protection in the embedded multimedia card in response to determining that the power failure protection identifier is an abnormal power failure identifier; and sending a write protection command to the embedded multimedia card, wherein the write protection command comprises the physical address and a length used for executing the write protection command on the read-only partition.

12. The device according to claim 8, wherein the operations comprise:
reading read-only state attribute control information of each partition of the embedded multimedia card, wherein the read-only state attribute control information comprises a partition number, a write protection attribute of the partition, a next startup write protection state of the partition, and a current write protection state of the partition;
determining whether the partition corresponding to the partition number is a partition under write protection according to the partition number; and
reading the next startup write protection state of the partition corresponding to the partition number from the read-only state attribute control information in response to determining that the partition corresponding to the partition number is a partition under write protection.

13. The device according to claim 12, wherein the operations comprise:
determining whether the next startup write protection state of the partition corresponding to the partition number is the write protection state;
determining whether the partition corresponding to the partition number is a write-protected partition in response to determining that the next startup write protection state of the partition corresponding to the partition number is the write protection state;
setting the partition to a write-protected partition in response to determining that the partition corresponding to the partition number is not a write-protected partition; and
updating the current write protection state of the partition to the write protection state; and
updating the current write protection state of the partition in response to determining that the partition corresponding to the partition number is a write-protected partition.

14. The device according to claim 13, wherein the operations comprise:
determining whether the next startup write protection state of the partition corresponding to the partition number is the write protection state;
determining whether the partition corresponding to the partition number is a write-protected partition in response to determining that the next startup write protection state of the partition corresponding to the partition number is not the write protection state;
canceling write protection of the partition in response to determining that the partition corresponding to the partition number is a write-protected partition; and
updating the current write protection state of the partition; and
updating the current write protection state of the partition in response to determining that the partition corresponding to the partition number is not a write-protected partition.

* * * * *